(12) United States Patent
Quinty

(10) Patent No.: US 9,244,467 B2
(45) Date of Patent: Jan. 26, 2016

(54) AUTOMATED WATER TEMPERATURE CONTROL SYSTEM

(71) Applicant: Glenn Quinty, Chalfont, PA (US)

(72) Inventor: Glenn Quinty, Chalfont, PA (US)

(73) Assignee: THERM-OMEGA-TECH, Inc., Warminster, PA (US)

( * ) Notice: Subject to any disclaimer, the term of this patent is extended or adjusted under 35 U.S.C. 154(b) by 373 days.

(21) Appl. No.: 14/018,092

(22) Filed: Sep. 4, 2013

(65) Prior Publication Data

US 2015/0059873 A1    Mar. 5, 2015

(51) Int. Cl.
*G05D 23/00* (2006.01)
*G05D 23/185* (2006.01)
*G05D 23/13* (2006.01)
*F24D 1/00* (2006.01)

(52) U.S. Cl.
CPC ............ *G05D 23/1852* (2013.01); *F24D 1/005* (2013.01); *G05D 23/00* (2013.01); *G05D 23/1333* (2013.01); *G05D 23/1386* (2013.01); *Y10T 137/7737* (2015.04)

(58) Field of Classification Search
CPC .............. G05D 23/00; G05D 23/1306; G05D 23/1333; G05D 23/1353; G05D 23/1386; F24D 1/005

USPC .......................... 236/12.1, 12.11, 12.12, 12.13
See application file for complete search history.

(56) References Cited

U.S. PATENT DOCUMENTS

| | | | |
|---|---|---|---|
| 3,232,336 A * | 2/1966 | Leslie et al. | 236/12.11 |
| 3,670,807 A * | 6/1972 | Muller | 165/299 |
| 4,653,524 A * | 3/1987 | Wilson | 137/110 |
| 5,623,990 A | 4/1997 | Pirkle | |
| 6,270,014 B1 | 8/2001 | Bollas et al. | |
| 6,286,464 B1 | 9/2001 | Abraham et al. | |
| 6,827,142 B2 | 12/2004 | Winkler et al. | |
| 7,025,077 B2 * | 4/2006 | Vogel | 137/13 |
| 7,044,213 B2 * | 5/2006 | Chang et al. | 165/263 |
| 7,073,528 B2 | 7/2006 | Kempf et al. | |
| 7,140,382 B2 | 11/2006 | Kempf et al. | |
| 7,240,853 B2 | 7/2007 | Taylor | |
| 7,434,745 B2 * | 10/2008 | Deiss et al. | 236/92 B |
| 7,740,182 B2 | 6/2010 | Lum et al. | |
| 7,971,601 B2 | 7/2011 | Lum et al. | |
| 8,209,796 B2 | 7/2012 | Eveleigh et al. | |

* cited by examiner

*Primary Examiner* — Kevin Murphy
(74) *Attorney, Agent, or Firm* — Cusick IP, PLLC; Clinton J. Cusick, Esq.

(57) ABSTRACT

A system of thermally activated feedback control valves and thermally activated sensors to provide heated fluid within a desired temperature range which operates consistently at high and low flow rates, suitable for control of combination safety shower and eyewash stations.

18 Claims, 19 Drawing Sheets

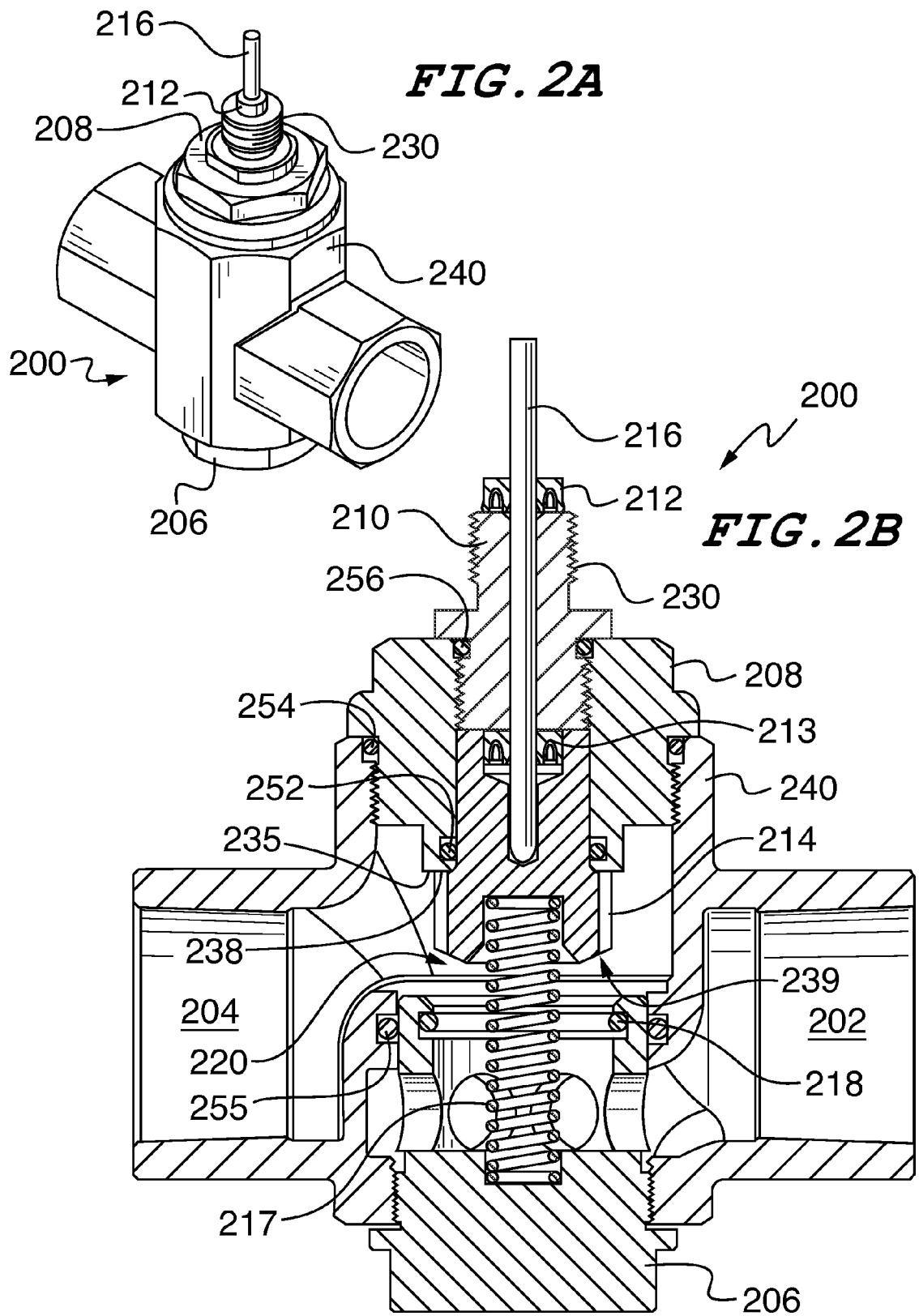

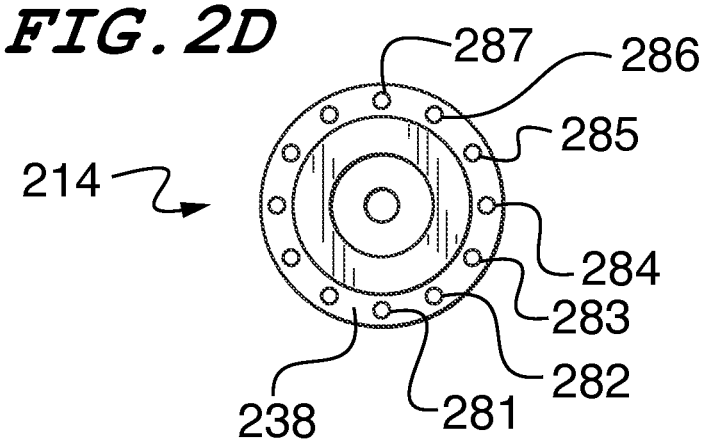
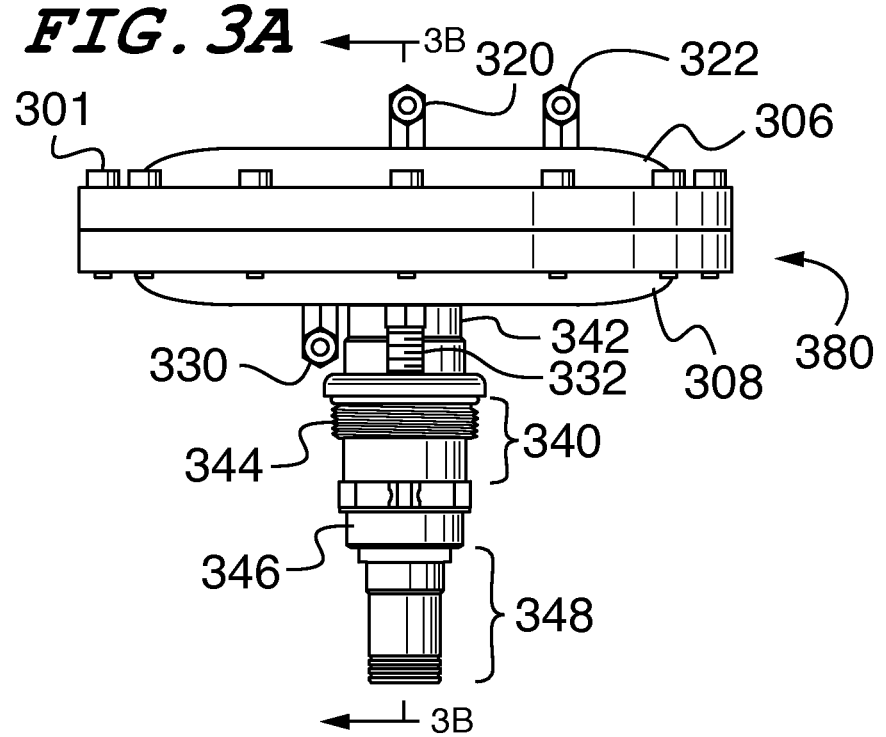

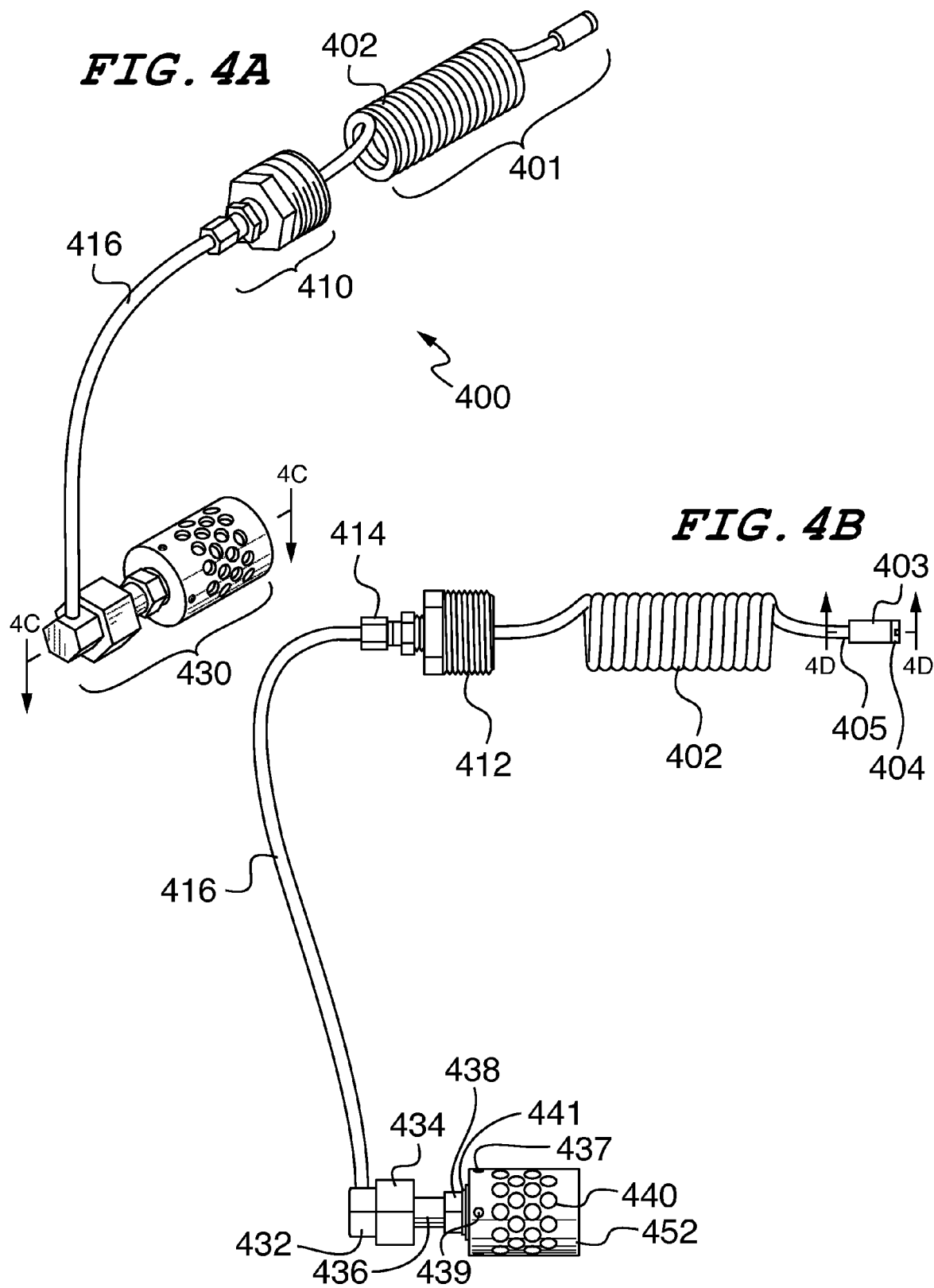

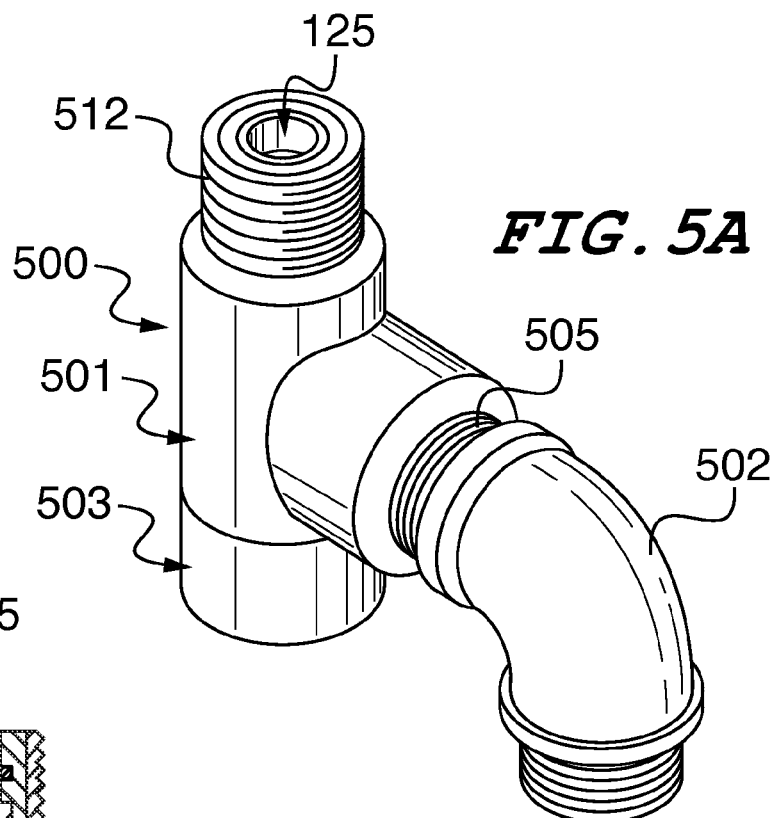
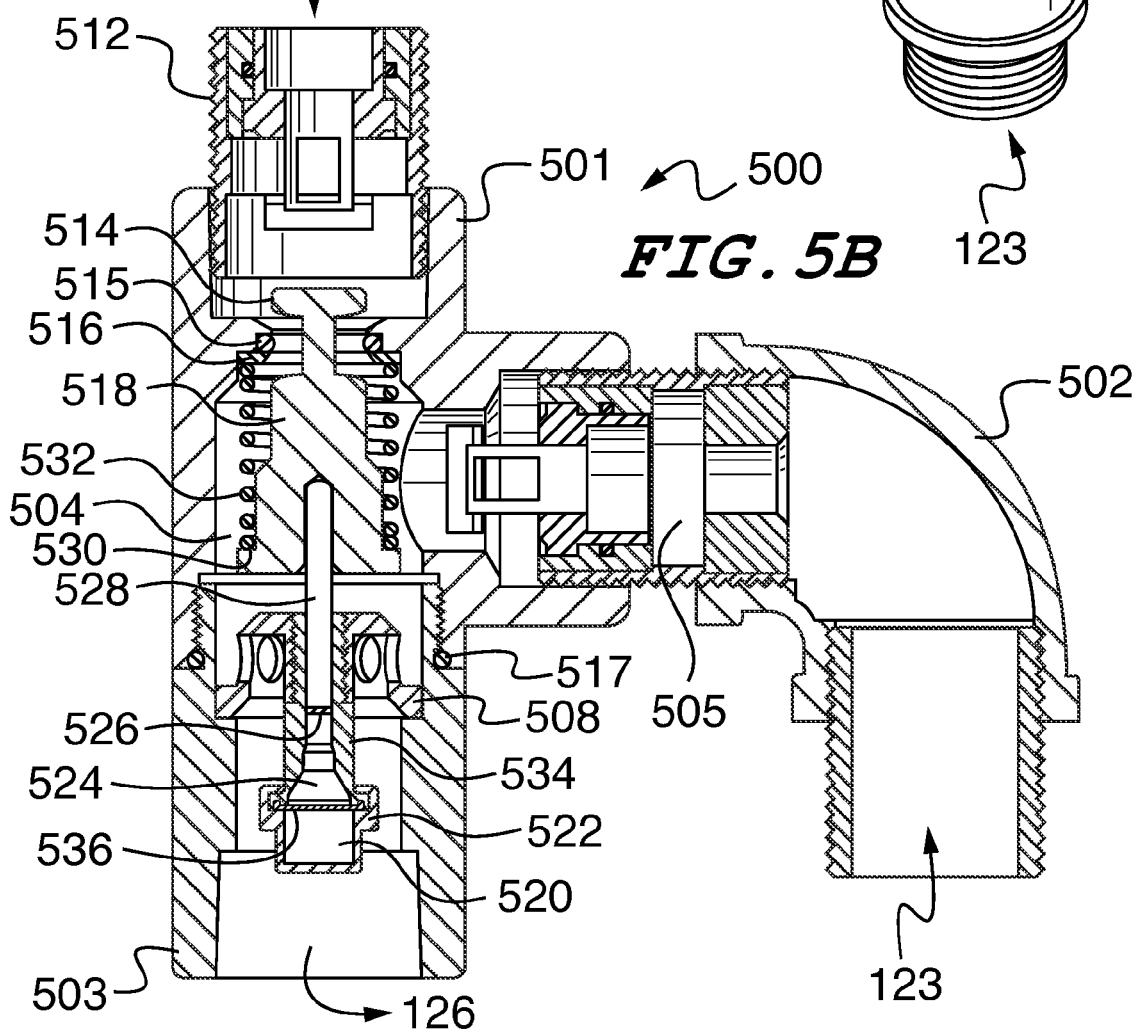

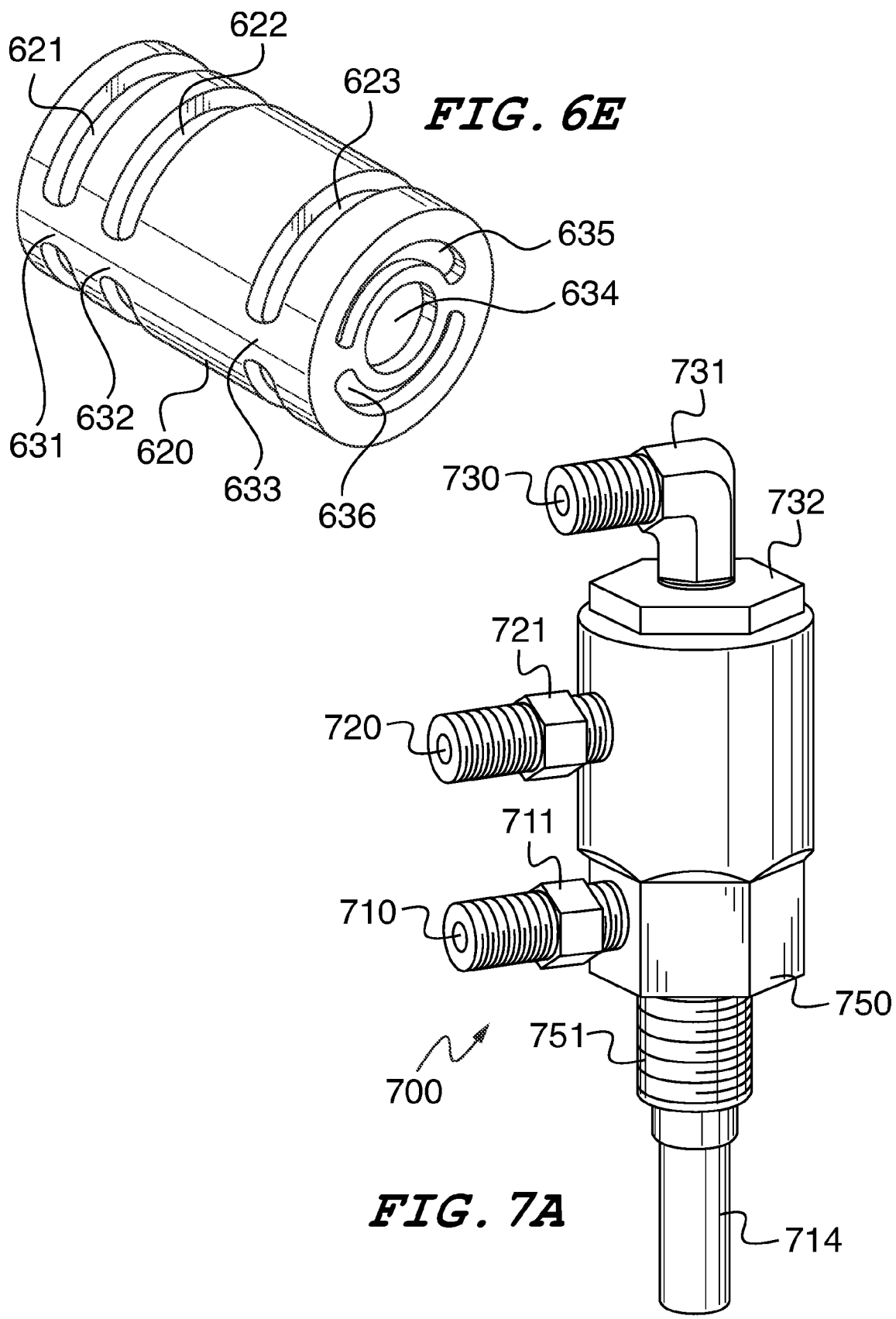

AUTOMATED WATER TEMPERATURE CONTROL SYSTEM

BACKGROUND OF THE INVENTION

1. Field of the Invention

The present general inventive concept is directed to an apparatus and method for controlling steam flow to heat supply water to provide tepid water at varying flow rates and to automatically and dynamically regulate the flow rates of steam and water to produce desired flow rates of tepid water within desired temperature limits. The inventive concept is useful in combination safety shower systems and other applications where rapid feedback control of fluid temperature is utilized.

2. Description of the Related Art

Numerous solutions have been devised and patented for the tepid water safety shower. Many improvements have also been directed to the purging of water from such systems to avoid bacteria and other concerns. Some inventions have used natural gas burners to create heat within the system. For instance, U.S. Pat. No. 8,209,796 discloses a safety shower that prevents stagnant water from causing a thermostat valve to open. This apparatus utilizes a gas burner to heat water in a hot water tank. U.S. Pat. No. 4,909,435 discloses a temperature controlled hot water delivery system that is controlled by valves and circuits. Other systems such as U.S. Pat. No. 6,270,014 also rely on microprocessors and electricity to control fluid systems. What is needed is a system that does not require an external power source, such as electricity, and can generate fluid at the desired temperature from a steam supply. U.S. Pat. No. 6,623,990 to Pirkle discloses a system that produces temperature-controlled water, however, the temperature control limits and response time of that system are not sufficient to achieve compliance with new industry standards. ANSI/ISEA standard Z358.1 was revised in 2009. This standard, entitled American National Standard for Emergency Eyewash and Shower Equipment includes many requirements including that the output water be between sixty degrees and one hundred degrees Fahrenheit and that the flow rate for a safety shower must be at least twenty gallons per minute. Additionally, the American Society of Sanitary Engineering Standard Number 1071 is entitled "Performance Requirements for Temperature Actuated Mixing Valves for Plumbed Emergency Equipment." This standard requires that outlet water temperature should be between 65 and 95 degrees F. and shall not exceed 100 degrees F. under normal operation; that upon failure of the hot water supply, the cold water shall continue to flow; and cross flow or leakage shall not exceed 50 cc per minute.

The '990 patent disclosed a system whereby a downstream temperature sensor would activate at an overtemperature condition to send cold water back to the steam line to prevent the overtemperature condition. However, this operation requires time to operate and results in unsteady output temperatures. Once water fouls the operation of the heat controller, it again takes time to achieve desired temperature outputs. This and other temperature control systems provide temperature feedback that is too late to prevent overtemperature conditions, but instead reacts to overtemperature conditions.

What is needed is an automated water temperature control system that can generate desired temperature fluid with rapid response time, narrow temperature control, and safety features to ensure that over-temperature fluid is not delivered to a user. Further, what is needed is a system that does not require electricity, is self regulating, and requires only water and steam to operate.

SUMMARY OF THE INVENTION

It is an aspect of the present invention to provide an automated water temperature control system that provides temperature controlled fluid to a user on demand, at differing required flow rates, the fluid delivered within a narrow temperature range.

The above aspects can be obtained by a steam path delivering steam to a first feedback control valve and a second feedback control valve which when open delivers steam to a heat exchanger to heat a first water supply path to produce heated water to a heated water path; a first feedback controller in contact with the heated water path that controls first feedback control valve and controls the flow rate of steam through first feedback control valve; a first mixing valve controlled by a first thermal actuator that combines a heated water stream and a second water supply path to produce a tempered water stream delivered to a second mixing valve controlled by a second thermal actuator to combine tempered water stream with a third water supply path to produce a tepid water stream in contact with a second feedback controller that controls the second feedback control valve to open steam flow when water flow is sensed and close steam flow when an overtemperature condition is sensed; an activation valve opens the system to the flow of water.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which:

FIG. 2A is a perspective view of a first feedback control valve in an embodiment of the invention.

FIG. 2B is a sectional view of a first feedback control valve in an open configuration in an embodiment of the invention.

FIG. 2D is a top view of the plunger of first feedback control valve in an embodiment of the invention.

FIG. 3A is a side view of a second feedback control valve in an embodiment of the invention.

FIG. 4A is a perspective view of a first feedback controller in an embodiment of the invention.

FIG. 4B is a side view of a first feedback controller in an embodiment of the invention.

FIG. 5A is a perspective view of a first mixing valve in an embodiment of the invention.

FIG. 5B is a sectional view of a first mixing valve open to supply fluid flow and heated fluid flow in an embodiment of the invention.

FIG. 6E is a perspective view of a spool in an embodiment of the invention.

FIG. 7A is a perspective view of a second feedback controller in an embodiment of the invention.

DETAILED DESCRIPTION

Figure 1A:
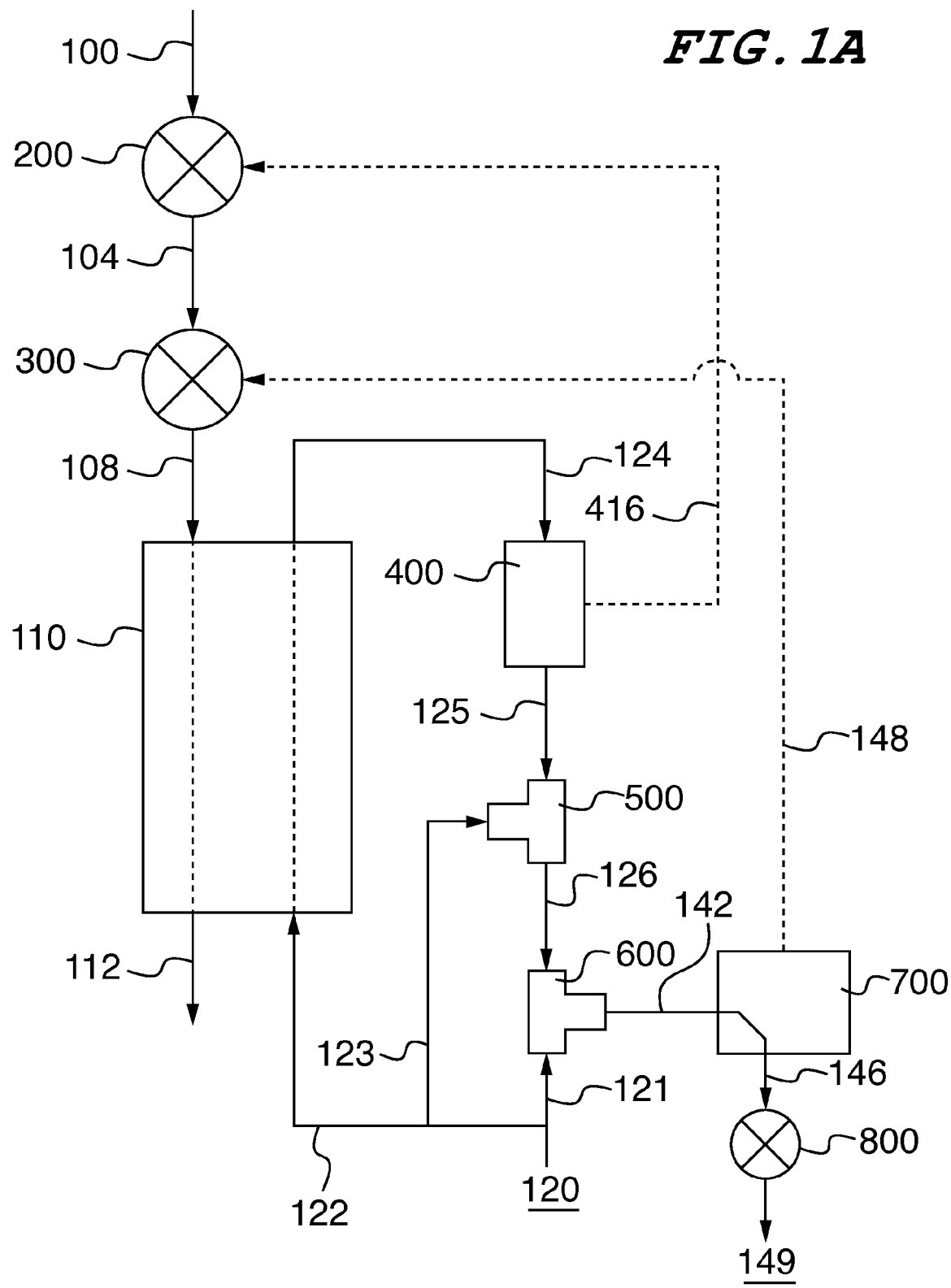
FIG. 1A is a schematic view of an embodiment of the invention

Reference will now be made in detail to the presently preferred embodiments of the invention, examples of which are illustrated in the accompanying drawings, wherein like reference numerals refer to like elements throughout.

The present inventive concept relates to the apparatus and components for controlling the heating of a fluid to within a narrow temperature range for more than one flow rate. This inventive concept has useful application to a combination safety shower and eyewash which both require tepid water to be delivered, albeit at different flow rates. The inventive concept can be used to heat other fluids to other temperature ranges within the spirit of the invention.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

FIG. 1A presents a schematic diagram of an automated water temperature control system in an embodiment of the invention. Steam is delivered to the system via a steam path 100 and passes through first feedback control valve 200. For clarity, the steam path will be designated in sections although each section can be similar or indistinct from the other sections and provided by means such as a pipe. Pipe materials can be brass or stainless steel or bronze or other materials known in the art. Steam passes through steam path second section 104 to second feedback control valve 300 which has the ability to close off the flow of steam and prevent passage of the steam into steam path third section 108. As will be detailed herein, second feedback control valve 300 is activated by the use of the system and the flow of fluid within the system. Thus, the flow of water within the system will cause the valve 300 to be open to the flow of steam. Additionally, other aspects of the system can sense an overtemperature condition and cause valve 300 to close to the flow of steam. When second feedback control valve 300 is open, steam is delivered by steam path third section 108 to a heat exchanger 110. Heat exchanger 110 can be a novel or conventional heat exchanger capable of transferring heat from one medium to another. Heat exchanger 110 is shown as a counter flow device where the steam flows in one direction and the fluid to be heated, such as water, flows in the other direction. The heat of the steam is imparted to the heat exchanger and steam substantially condenses into water and is discharged from heat exchanger 110 through condensate outlet 112 which can flow to a collection means or discharge means such as a drain, not shown.

Cold water is supplied to the system via water supply 120 to first water path 122, second water supply path 123, and third water path 121. These water paths can branch from a common supply line as shown with water supply 120, or be provided via separate lines. First water path 122 delivers supply water to heat exchanger 110 where it is heated to produce heated water that flows through heated water path first section 124. First feedback controller 400 is in contact with the heated water path first section 124 and provides feedback to first feedback control valve 200 through capillary section 416. Heated water path second section 125 delivers heated water to first mixing valve 500 which combines heated water path second section 125 with second water supply path 123 to produce tempered water that flows through tempered water path 126. Tempered water path 126 is connected to second mixing valve 600 which combines tempered water path 126 with third water path 121 to produce tepid water stream 142. Tepid water stream 142 contacts second feedback controller 700 before delivering tepid water at the tepid water outlet 146. Activation valve 800 is shown connected to tepid water outlet 146. Activation valve 800 can comprise any lever or pedal or knob configuration in which a user can open a valve to the flow of water. Actuation valve 800 can be a ball valve or other valve type known in the art. When second feedback control valve 300 is closed, steam does not flow through the system as shown in FIG. 1A. When Activation valve 800 is closed, water does not flow through the system, but each of the supply paths 121, 122, and 123 are pressurized and will provide water flow through to tepid water stream 142 and tepid water outlet 146 if activation valve 800 is opened.

FIG. 1A presents a view of a system that will provide temperature controlled fluid at tepid water outlet 146 on demand, by a user. Because water supply is allowed to flow through the various mixing valves and feedback controllers, it is only activation valve 800 that prevents the flow of supply water through the system. Upon opening or activation of activation valve 800, supply water flows through the system, and as will be detailed below, the failure of any the components of the system will not prevent the flow of supply water. Thus the system will operate to provide tepid water to a user, but upon failure will still provide supply water to a user. Opening activation valve 800 provides for flow to tepid water delivery 149.

Second feedback controller 700 reacts to the temperature of tepid water stream 142 and in the event of an overtemperature condition, acts on second feedback control valve 300 by pressure communication 148 to shut off the flow of steam through the valve to steam path third section 108 and thus depriving heat exchanger 110 of the means to heat first water path 122. First feedback controller 400 acts on first feedback control valve 200 to allow either a high flow of steam or a low flow of steam to steam path second section 104 as described herein. In this way the various elements of the system combine to deliver flow at the desired flow rates within desired temperature ranges. The elements in FIG. 1 are shown in a rough and approximate schematic with lines showing functional connections rather than actual positions. For clarity, the drawing is simplified and generalized with many specific parts omitted. In the next figures, specific embodiments will be shown in detail.

Figure 1B:
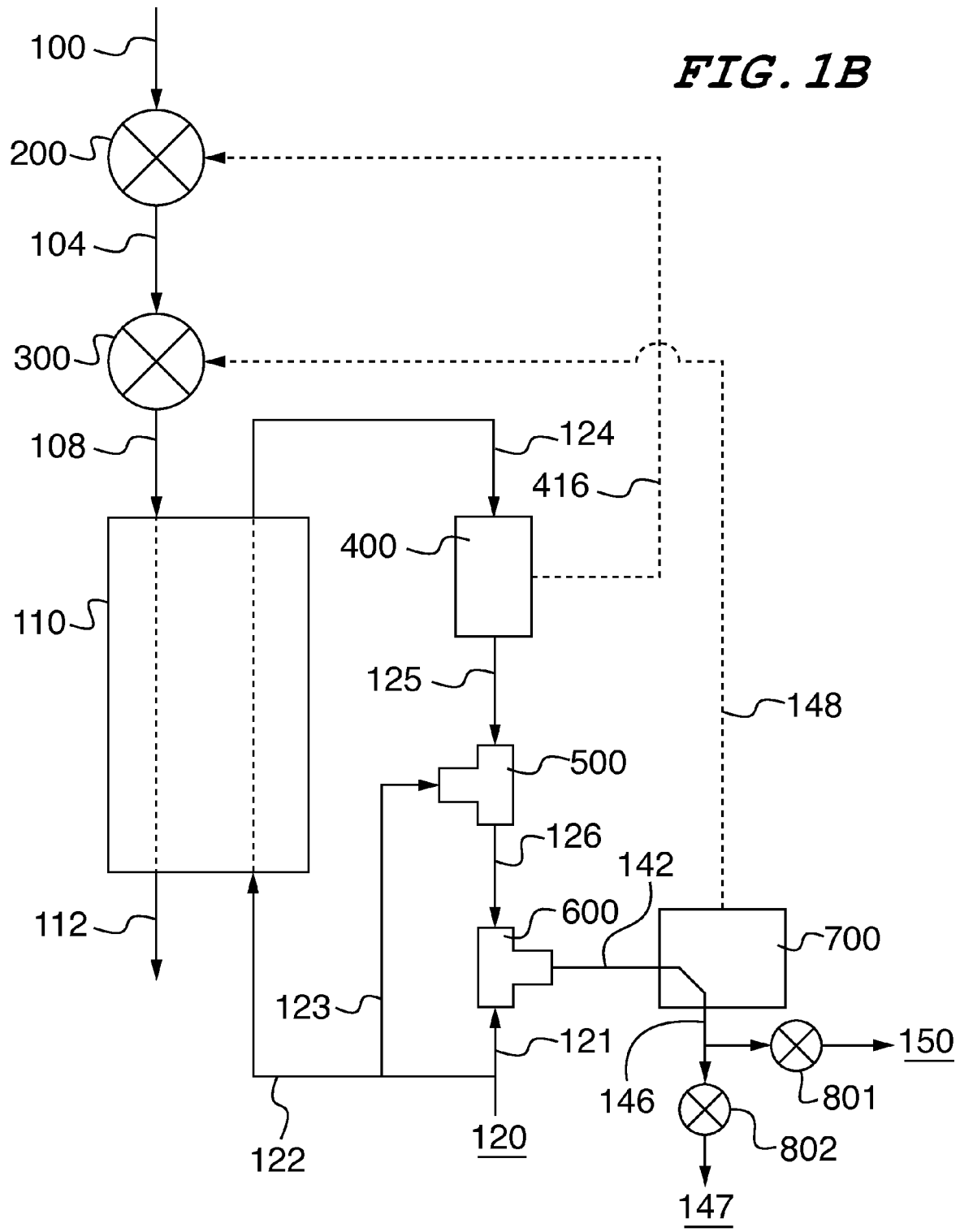
FIG. 1B is a schematic view of another embodiment of the invention.

FIG. 1B presents a schematic view of another embodiment of the invention. Where tepid water delivery is desired at two different flow rates, the system can employ an eyewash activation valve 802 and a shower activation valve 801 to provide the desired flow rates. Tepid water outlet 146 can be connected to shower activation valve 801 which upon opening provides for flow to shower delivery 150. Shower delivery 150 can be an overhead shower fitting known in the art or other means of spraying water upon a user. Fittings known in the art can be employed to provide that shower delivery 150 provides a flow rate of about 20 gallons per minute over a moderate range of water pressures. Tepid water outlet 146 can also be connected to an eyewash activation valve 802 that can be activated by a user to open it to flow to eyewash delivery 147. Eyewash delivery 147 can be an eyewash fountain or other configuration known in the art to provide water to a user's face and eyes. Eyewash delivery 147 can comprise fittings and fixtures known in the art to provide a flow rate of about 2 gallons per minute over a range of water pressures.

FIG. 2A shows a perspective view of an embodiment of a first feedback control valve 200. Steam piston 216 is shown protruding from the top of the valve. Seal 212 surrounds steam piston 216 and provides a seal. Seal 212 can be a spring energized lip seal made of PTFE. One provider of these seals is known as Variseal® brand seals. Upper cap 208 is threadedly attached to valve body 240 and aids in assembly and retention of the valve components. Lower cap 206 is threadedly attached to valve body 240 and also aids in the retention of valve components. Stem threads 230 facilitate connection with first feedback controller 400 shown in FIG. 1.

FIG. 2B shows a sectional view of a first feedback control valve 200 in an open configuration in an embodiment of the invention. This valve throttles the supply of steam between an open configuration suited for higher flow rates of steam to heat higher flow rates of water, and a substantially restricted or throttled configuration suited to provide a small amount of steam to heat a small amount of water. These open and restricted positions can correspond to shower operation at high flow and eyewash operation at low flow. It can be appreciated that an overall body decontamination shower requires more flow rate and more heating than an eyewash station that requires less flow. An open configuration of first feedback control valve corresponding to increased steam flow is shown in FIG. 2B. An open configuration corresponds to a high flow of steam through valve body 240. Steam inlet 202 is connected to steam path 100 not shown. Steam travels through the valve body 240 to steam outlet 204. Valve body 240 is shown as cross shaped and substantially hollow, and is closed at the bottom by lower cap 206 and is partially closed at the top by upper cap 208 configured to receive stem 210. Seal 212 prevents leakage in conjunction with seal 213 and stem 210 and upper cap 208 and steam piston 216 combine to close the top of valve body 240. Seal 212 and seal 213 can comprise a spring energized lip seal. Steam piston 216 operates on steam plunger 214 to substantially close the valve 200 to steam flow by occluding steam passage 220. Steam plunger 214 contacts O-ring 218 to provide a seal. O-ring 218 can be a PTFE encapsulated elastomer such as Viton brand elastomer or a silicone elastomer. Spring 217 provides the return force to steam plunger 214 and opens the valve to steam flow by pushing steam plunger 214 upward in the absence of force from steam piston 216 upon steam plunger 214 and returns steam plunger 214 to an open configuration. Upper cap 208 has cap shoulder 235 which is configured to engage plunger shoulder 238 and provide a stop so that spring 217 cannot force steam plunger 214 past the position shown in FIG. 2B. Stem 210 threadedly engages upper cap 208 whereas steam piston 216 is slidable within stem 210 to act on steam plunger 214 which can move within upper cap 208. O-ring 256 provides a seal between stem 210 and upper cap 208. O-ring 254 provides a seal between upper cap 208 and valve body 240. O-ring 252 provides a seal between upper cap 208 and steam plunger 214. O-ring 255 provides a seal between lower cap 206 and valve body 240. Lower cap 206 is shown as being perforated to allow the passage of steam from seam inlet 202 to steam passage 220. Plunger bottom 239 is shown spaced apart from lower cap 206 and O-ring 218.

Figure 2C:
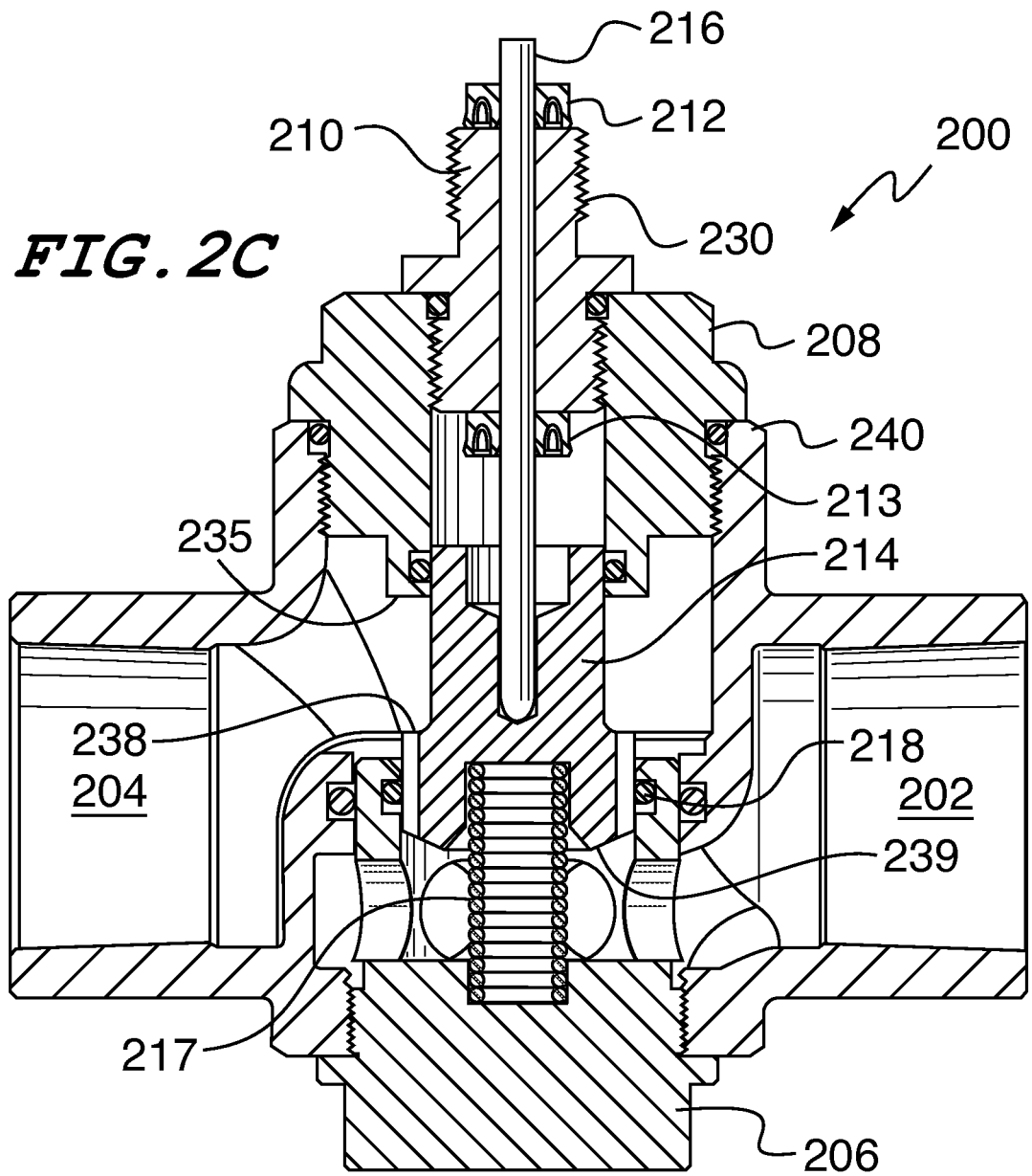
FIG. 2C is a sectional view of a first feedback control valve in a substantially closed configuration in an embodiment of the invention.

FIG. 2C shows first feedback control valve 200 in a restricted configuration in an embodiment of the invention. Action by steam piston 216 upon steam plunger 214 moves steam plunger 214 so that plunger bottom 239 engages O-ring 218 to reduce steam flow through valve body 240 by blocking steam passage 220, not shown. Steam plunger 214 is configured with a plurality of bored passages running through the periphery of steam plunger 214 from plunger shoulder 238 to plunger bottom 239. Thus, when the steam plunger 214 contacts O-ring 218 to substantially block the passage of steam through valve body 240, steam can still pass through the bored passages from plunger bottom 239 to plunger shoulder 238 and therefore steam flows from steam inlet 202 to steam outlet 204.

FIG. 2D presents a top view of steam plunger 214 in an embodiment of the invention. A plurality of holes numbered 281 through 287 are shown disposed in the periphery of steam plunger 214 and in this view appear as an opening in the surface of plunger shoulder 238. The plurality of holes 281 to 287 can be bored passages formed by drilling through steam plunger 214 to form a hole. A number of bored passages can be drilled in order to form the plurality of holes, for example 281, 282, 283, et cetera. The balance of the plurality of holes are not numbered, but can be uniform with the numbered bored passages 281 through 287 and can be formed by drilling or other means known in the art. The number and diameter of the plurality of holes can be altered to provide more or less cross sectional area as desired. The cross sectional area, rather than the number of holes determines the flow rate of steam in the restricted configuration. The bored passages together form a plurality of holes to allow steam to pass through steam plunger 214 as one side of each bored passage presents an opening in plunger bottom 239 and provides for the flow of steam to plunger shoulder 238 and therefore through valve body 240 when the second feedback control valve is in a restricted configuration. The cross sectional area available to steam flow is much less through the plurality of holes 281, etc., than available through steam passage 220 as shown in FIG. 2B. Steam plunger 214 comprises a plurality of holes so that in a closed position, it puts valve 200 in restricted configuration that provides a low flow of steam sufficient to allow the system of the invention to heat approximately two gallons of water per minute to approximately 95 degrees F. In one embodiment, a one inch internal diameter pipe provides a cross section area of about 0.785 square inches whereas a plurality of bored holes can provide about 0.1 to 0.4 square inches and provide a restricted configuration steam flow of approximately one eighth to one half of the steam flow when first feedback control valve 200 is in an open configuration.

Valve elements are preferably composed of a non-reactive metal such as brass and seal elements are preferably composed of PTFE material. This particular embodiment has been shown to provide sufficient flow to heat large volumes of water while also being configured to move into a restricted configuration that provides a reduced, consistent level of steam for low flow rate requirements. Steam plunger 214 can travel past O-ring 218 as shown in FIG. 2C so that it does not immediately retract into the open configuration, but provides stability so that the plunger does not cause the valve to quickly oscillate between open and restricted configurations.

Figure 7B:
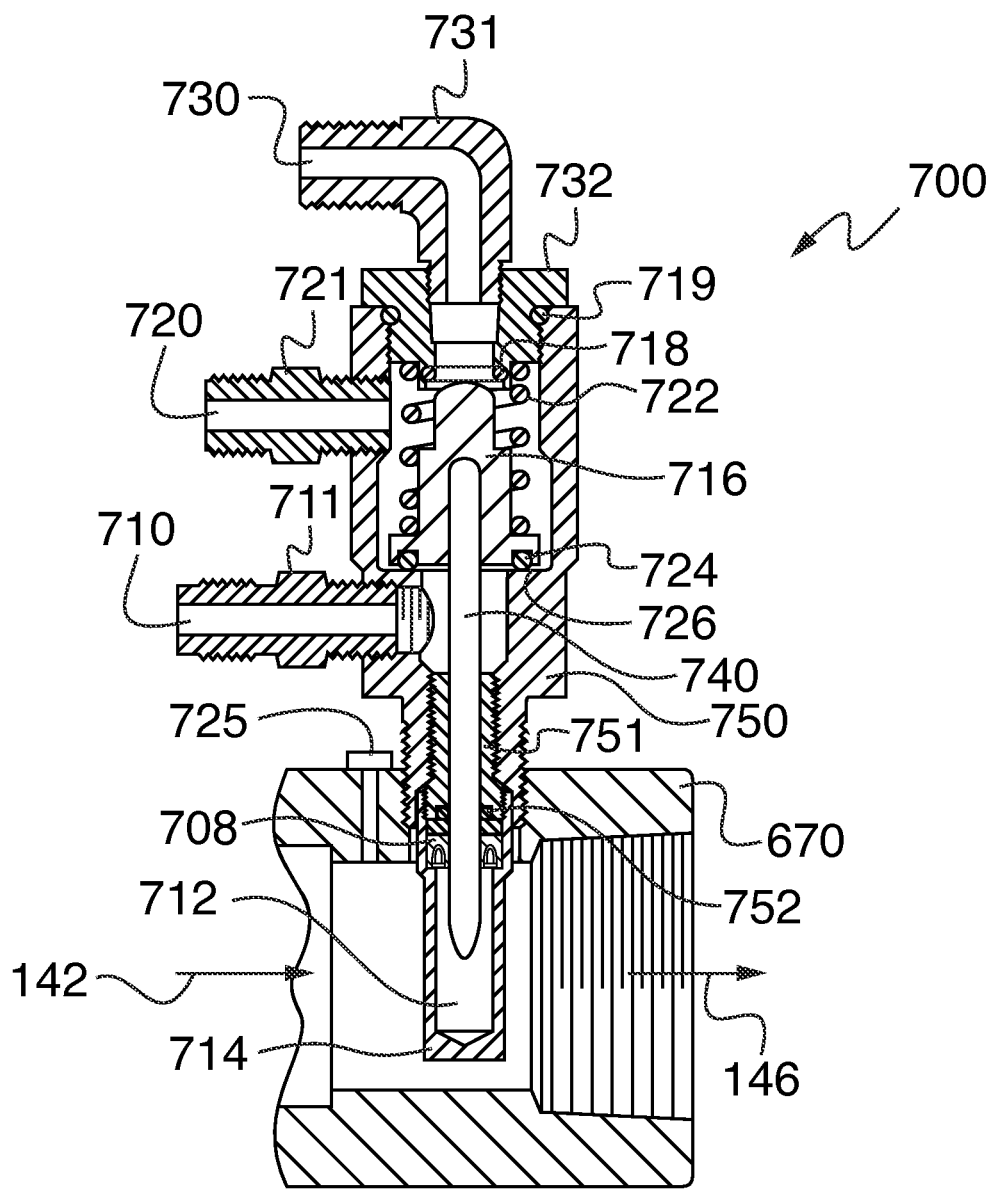
FIG. 7B is a sectional view of a second feedback controller in an embodiment of the invention.

FIG. 3A presents a side view of the actuation assembly 380 of a second feedback control valve in an embodiment of the invention. Actuation assembly 380 contains the moving parts that control the steam flow and are installed in valve body 370 which is not shown in this view for clarity. First dished head 306 and second dished head 308 combine to retain a diaphragm 304, not shown, and are held together with a plurality of fasteners, for example bolts. Any number of fasteners can be used, but in this embodiment, twelve bolts are utilized but only one is numbered as 301. The combination of first dished head 306 and second dished head 308 when combined and fastened provide a diaphragm housing. Water supply is typically provided at a pressure of approximately 60 psi, and can be experienced within the dished heads, requiring sufficient retaining force and strength of materials as is known in the art. Two ports are present on the top of first dished head 306. Top supply port 320 provides access to the interior of first dished head 306. Top supply port 320 is connected to water supply. This fluid communication provides pressure equal to the water supply pressure which is in the range of 60 psi. Top drain port 322 also provides access to the interior of first dished head 306. Two ports are present on second dished head 308. Bottom supply port 330 and bottom drain port 332 provide access to the interior of second dished head 308. Bottom supply port 330 is connected to water supply, which fluid communication also provides pressure equal to water supply pressure, typically about 60 psi. Connections such as flared connections, can be used to connect top supply port 320 and bottom supply port 330 to water supply using conventional fittings. For example, brass threaded fittings connected to a PTFE tubing shrouded in braided stainless steel can be used to provide flexibility and strength, however, other materials known in the art can be employed. Top drain port 322 and bottom drain port 332 can also be connected with a threaded brass fitting connected to PTFE tubing shrouded in braided stainless steel to connect to the elements as shown in FIGS. 7A and 7B. Diaphragm cap 340 is threadedly connected to upper stem 362, not shown, to compress spacer 342. Spacer 342 can be formed of PTFE and is compressed between second dished head 308 and diaphragm cap 340 and provides stable connection between these elements while allowing for the rotation of first dished head 306 and second dished head 308 so that the ports 320, 322, 330, 332, can be oriented correctly for connection with other parts of the system to facilitate construction of the system.

Diaphragm cap 340 comprises cap threads 344 to facilitate threaded connection with valve body, not shown. Diaphragm seat 346 is positioned next to diaphragm cap 340. Indicator 348 is shown positioned next to diaphragm seat 346 and connected by means shown in FIG. 3B.

Figure 3B:
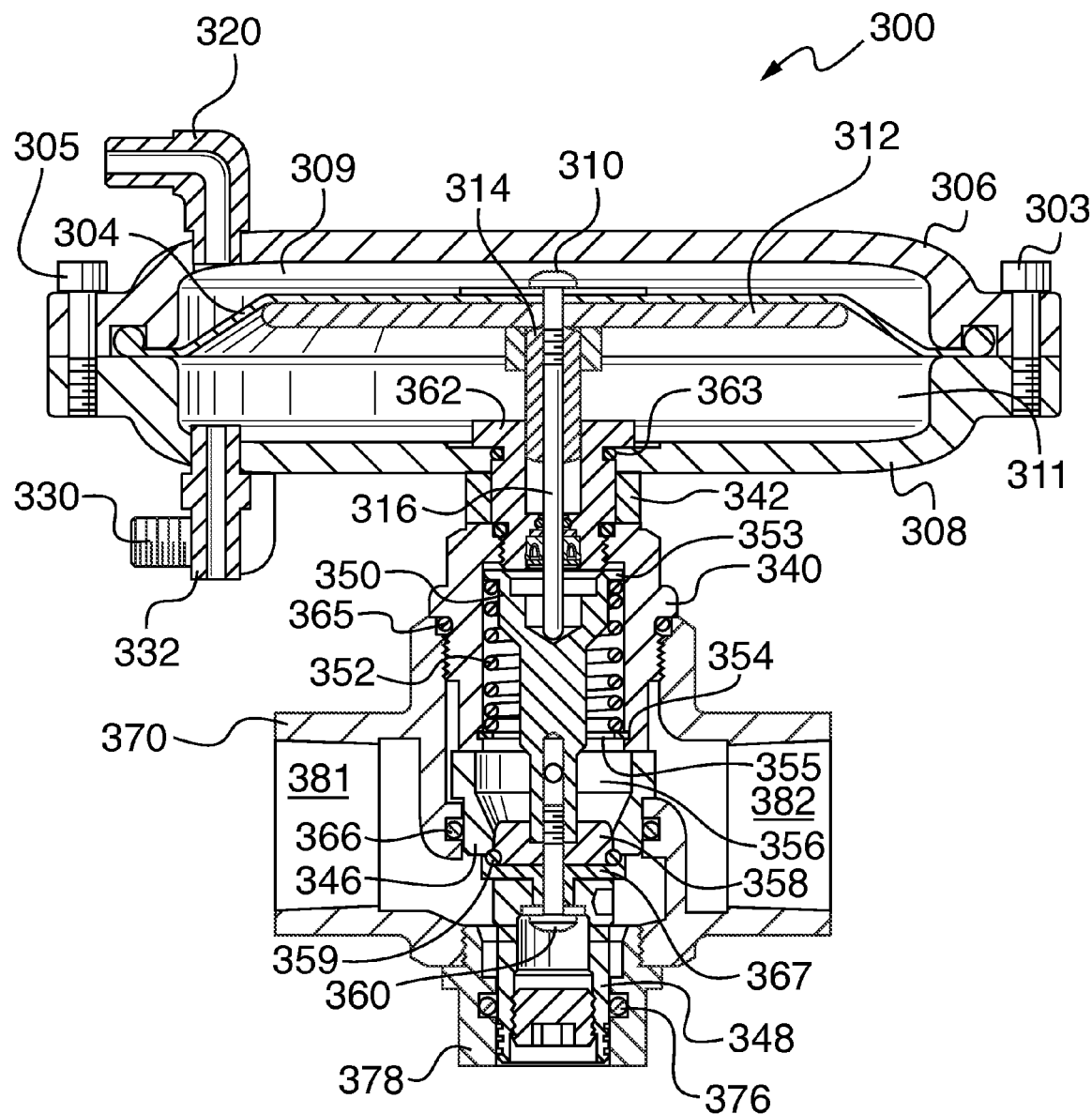
FIG. 3B is a sectional view of a second feedback control valve in a closed configuration in an embodiment of the invention.

FIG. 3B shows a sectional view of second feedback control valve 300 in an embodiment of the invention. The valve 300 is shown as closed to the flow of steam, or in a closed configuration. Diaphragm 304 is flexible and preferably made of EPDM rubber (ethylene propylene diene monomer), an elastomer, but other elastomers can be used. Within the diaphragm housing, diaphragm 304 is positioned between first dished head 306 and second dished head 308 that are held together with a plurality of fasteners, for example bolts. Bolts 303 and 305 are shown in this view. Activation screw 310 engages diaphragm 304 reinforced by plate disc 312 while threadedly connected to bushing guide 314. The distal end of activation screw 310 contacts diaphragm piston 316 which in turn engages valve cage 350 which is biased toward diaphragm piston 316 by spring 352. Spring 352 contacts cage shoulder 353 at one end and retaining ring 355 at the other end. Retaining ring 355 contains spring 352. Retaining ring 355 is positioned within retaining groove 354. Valve cage 350 is partially disposed within cap seat 356 which is substantially hollow and allows for the movement of elements within the interior. Cap seat interface 346 is contacted by plug 358 to close off cap seat 356 to the flow of steam through valve 300 as shown in the configuration of FIG. 3B. O-ring 359 helps seal cap seat interface 346 and plug 358 against leakage. Indicator 348 is connected by fastener 360 which also compresses plug 358 against cage 350. Thus, elements 360, 358, 350, as well as 316 and 310 move in concert. Cap seat 356 is substantially hollow and allows for the movement of cage 350 within the hollow interior. Plug holder 367 provides spacing between indicator 348 and plug 358 and provides stability and centering of plug 358. O-ring 376 provides a seal between lower cap 378 and indicator 348 while allowing for indicator 348 to slide up and down within lower cap 378 and into valve body 370. Upper stem 362 is connected to second dished head 308 and sealed with O-ring 363. Upper stem 362 is threadedly connected to diaphragm cap 340 and is sealed by O-ring 364. O-ring 365 helps to seal diaphragm cap 340 to valve body 370. The seal between valve body 370 and cap seat 356 is aided by O-ring 366.

First space 309 is situated between first dished head 306 and diaphragm 304. First space 309 is in fluid communication with top supply port 320 and filled with water provided by top supply port 320, viewable in cross section in this view. First space is in fluid communication with top drain port 322 not shown. When drain port 322 is closed in other portions of the system, it does not drain and first space 309 is at supply pressure, nominal 60 psi in an embodiment of the invention. Second space 311 is connected to bottom supply port 330, which provides fluid communication and pressure communication with supply water and absent other actions, provides second space 311 with pressure at a nominal 60 psi, or other pressure provided by supply water connected to the system. Second space 311 is also connected to bottom drain port 332 to provide fluid communication, if bottom drain port 332 is closed in other parts of the system, second space 311 will be filled with water and pressurized at the supply pressure, from fluid communication with bottom supply port 330, or a nominal 60 psi in an embodiment of the invention. When first space 309 and second space 311 are at equivalent pressures, spring 352 controls the operation and pushes valve cage upward, ensuring that plug 358 occluded cap seat 356 to close second feedback control valve 300 to the flow of steam. Cage shoulder 353 contacts diaphragm cap 340 to limit maximum movement.

Figure 3C:
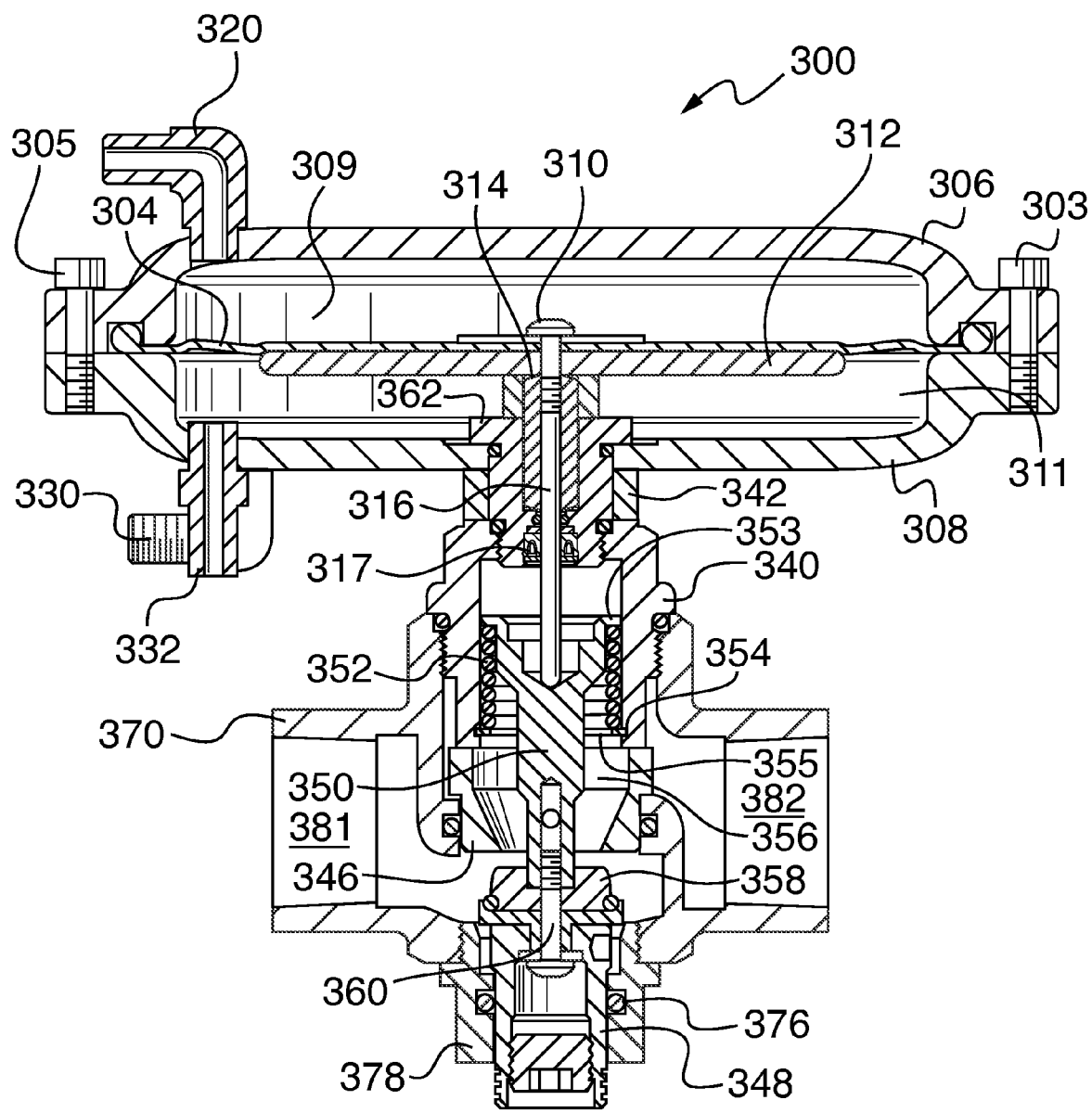
FIG. 3C is a sectional view of a second feedback control valve in an open configuration in an embodiment of the invention.

FIG. 3C presents a sectional view of second feedback control valve 300 in an open configuration in an embodiment of the invention. As shown, valve 300 is open to the flow of steam. As will be explained in conjunction with tepid water control sensor in FIG. 7A, when bottom drain port 332 is open to flow, it causes a decrease in pressure in second space 311 and causes diaphragm 304, plate disc 312, and activation screw 310 to move towards valve body 370 to provide the configuration as shown in FIG. 3C which is open to the flow of steam. Because diaphragm piston 316 pushes valve cage 350, fastener 360, and plug 358 downward, plug 358 no longer seals the opening in cap seat 356, and steam is now able to flow from steam inlet 381 through valve body 370 to steam outlet 382. Bushing guide 314 has an extended collar which contacts upper stem 362 and limits the maximum travel of activation screw 310 and bushing guide 314 and the related elements. In an embodiment of the invention, steam path second section 104, not shown, is connected to steam inlet 381 and steam outlet 382 is connected to steam path third section 108, not shown.

As will be explained further in conjunction with the other elements of the invention, second feedback control valve 300 can be returned to the configuration in FIG. 3B to close the valve to the flow of steam and therefore close off flow of steam through the system based on either an overtemperature condition in tepid water stream 142 or upon closing of activation valve 800, both presented in FIG. 1. Indicator 348 is positioned outside of valve body 370 in FIG. 3C and communicates the status of the internals of second feedback control valve 300. When the valve 300 is open to steam flow, indicator 348 is viewable outside of the valve body 370 and visibly informs the position or function of the valve and whether it is open or closed to steam flow. With respect to second feedback control valve 300, open means open to steam flow and closed means closed to steam flow. When pressures in the first space 309 and second space 311 are equalized, spring 352 provides sufficient force to move valve cage 350 upwards and draw plug 358 into cap seat 356, closing off steam flow and returning the valve to the configuration in FIG. 3B. When steam flow is blocked by valve 300, water supply path (not shown) is unaffected and unheated water continues to flow through the system. The flow of water through the system and at 146 is controlled by activation valve 800, as shown in FIG. 1A. In an alternate embodiment, flow of water through the system can be controlled by shower activation valve 801 or eyewash activation valve 802 as shown in FIG. 1B.

FIG. 4A is a perspective view of a first feedback controller 400 in an embodiment of the invention. A temperature sensing section 401 is comprised of a coil of conductive material, for example metal, and advantageously copper. Copper is conductive, malleable, and affordable, but other material and metals can be used. For example brass and stainless steel are suitable materials. The coil 402 is filled with a thermally expansive substance, for example an elastomer. Coil 402 is inserted into heated water path first section 124, not shown, in order to be in temperature communication with heated water in the system. Connection assembly 410 allows the retention of coil 402 within a pipe, casing, valve, or the like via threaded connection. Sensor actuator 430 contains a piston (not shown) that is acted upon by the thermally expansive substance when coil 402 is heated. As discussed herein in conjunction with the other elements of the invention, first feedback controller 400 provides feedback control of first feedback control valve 200 to open or restrict the flow of steam through first feedback control valve 200 as disclosed in FIGS. 2A through 2D.

FIG. 4B presents a side view of a first feedback controller 400 in an embodiment of the invention. A hollow tube such as copper tubing is coiled to provide coil 402 and filled with a thermally expansive substance (not shown). Closure sleeve 403 is soldered onto coil end 405 and capillary cap 404 is threadedly connected to closure sleeve 403 to seal the end of coil 402 to prevent leakage of the thermally expansive substance. Capillary cap 404 is optionally slotted to facilitate rotation. Coil 402 can extend in one continuous length through capillary bushing 412 which provides for installation within a pipe or valve body by threaded connection. Capillary fitting 414 retains capillary section 416 which engages capillary actuator cup 432 which is threadedly connected to guide nut 434 which retains capillary actuator guide 436 which in turn is threadedly connected to swivel 438. Retaining ring 441 retains heat dissipater 440 which is preferably a perforated metal cylinder. Retaining ring 441 prevents the movement of heat dissipater 452 in the direction of guide nut 434, shown to the left in FIG. 4B. Heat dissipater 452 is retained on swivel 438 by a plurality of set screws, not shown in this figure, which can be inserted in openings such as threaded opening 439 or threaded opening 437. Heat dissipater 452 is perforated to assist in the dissipation of heat, one such perforation is labeled 440 in FIG. 4B. In an embodiment of the invention, coil 402 filled with silicone oil can provide a movement of capillary piston 439 of 0.003 to 0.005 or more inches per degree of temperature increase of coil 402. Increased temperature of coil 402 warms the silicone oil and the thermal expansion is transmitted to the capillary section 416. Silicone oil such as Dow Corning DC 200 can be used in an embodiment. Guide nut 434 is threadedly connected to capillary actuator cup 432 and retains capillary piston guide 436.

Figure 4C:
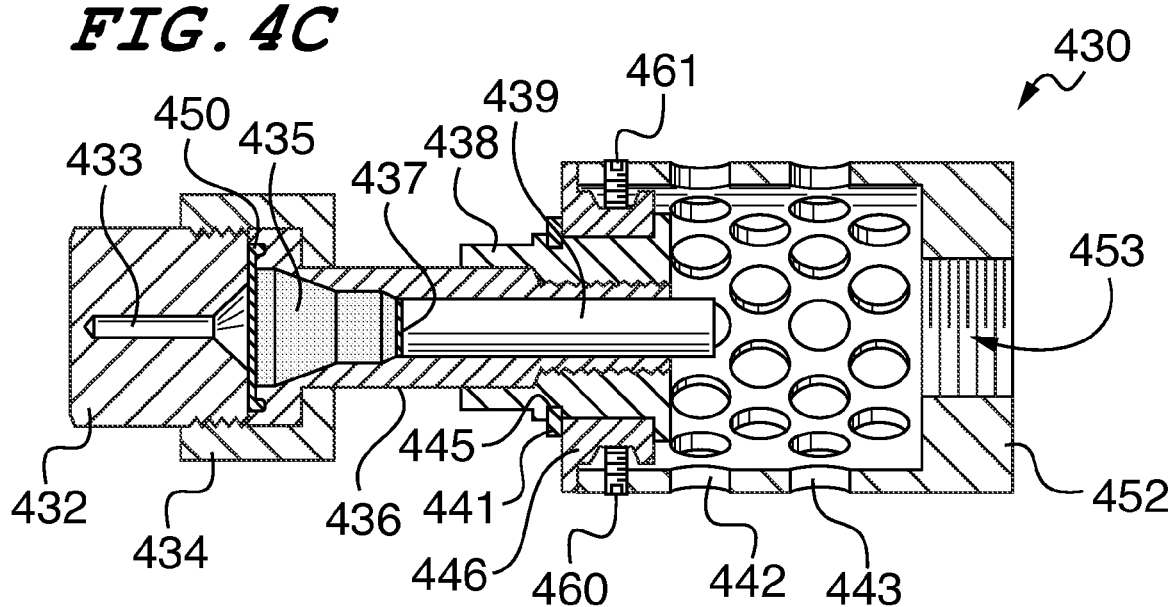
FIG. 4C is a sectional view of a sensor actuator in an embodiment of the invention.

FIG. 4C presents a sectional view of a sensor actuator in an embodiment of the invention. Sensor actuator 430 is shown in cross section. Heat dissipater 452 is retained on swivel 438 by a plurality of set screws, one of which is shown as set screw 461 which occludes threaded opening 437 of FIG. 4B. Set screw 460 also acts to retain heat dissipater 452 on swivel 438. Swivel 438 comprises a circumferential groove 445 to accommodate retaining ring 441 which provides retention of bushing 446 between swivel 438 and retaining ring 441. Thermal channel 433 is present in capillary actuator cup 432 and allows for the expansion of a thermally expansive substance such as silicone oil to provide a force upon diaphragm 450 which in turn displaces actuator plug 435 to engage antiextrusion disc 437 and force capillary piston 439 through capillary piston guide 436. In an embodiment, silicone oil is used to fill coil 402 and capillary section 416 and provides linear expansion across a temperature range of at least 50 degrees F. to 150 degrees F. Heat dissipater 452 is cylindrical and hollow and the distal end contains threads 453 suited to engage stem threads 230 of first feedback control valve 200 shown in FIG. 2A. In an embodiment, steam piston 216 of FIG. 2B is contacted by capillary piston 439 of FIG. 4C, and in this way, the force provided by the thermally expansive substance, not shown, provides a force upon capillary piston 439 that contacts steam piston 216, transmits the force to steam piston 216 which transmits the force to steam plunger 214 to overcome spring 217 to control first feedback control valve 200 and put the valve in a restricted configuration to restrict steam flow as discussed in relation to FIGS. 2A through 2C. In an embodiment of the invention first feedback controller 400 can sense the temperature of fluid contacting coil 402 and can produce movement of capillary piston 439 into steam piston 216 to put second feedback control valve 300 into restricted configuration upon sensing a heated water stream having a temperature of at least about 130 degrees F. Additional length of coil 402 can be utilized to effect greater thermal expansion and produce a restricted configuration in 200 upon sensing heated water stream first section 124 temperature of at least 120 degrees F. Other embodiments can be constructed where increasing the length of coil 402 increases the cumulative expansion of a thermally expansive substance, and decreasing the length of coil 402 would result in cumulatively less expansion and operation to control first feedback control valve 200 to a restricted configuration at a higher temperature. When coil 402 and capillary section 416 are filled with a material such as silicone oil, first feedback controller is essentially full and will begin to act and expand incrementally at any increase in temperature. If constructed at an ambient temperature of 75 degrees F., an incremental increase in temperature will begin to cause the controller to act. Coil 402 is physically able to provide thermal expansion when exposed to temperatures greater than the temperature at which it was assembled. Perforations 442 and 443 are shown in cross section and assist in the dissipation of heat.

Figure 4D:
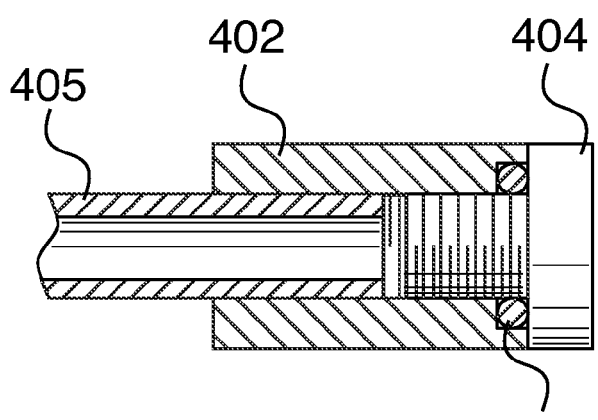
FIG. 4D is a sectional view of a coil end in an embodiment of the invention.

FIG. 4D presents a cross section view of coil end 405. Closure sleeve 402 is soldered to coil end 405. O-ring 403 provides a seal between capillary cap 404 and closure sleeve 402 as they are threadedly connected.

FIG. 5A presents a perspective view of first mixing valve 500 in an embodiment of the invention. Heated water path second section 125 is connected to check valve 512 which is in turn connected to valve body 501. Second water supply path 123 is threadedly connected to check valve 505 through elbow 502. Check valve 505 is threadedly connected to valve body 501. Check valves 505 and 512 are oriented so as to allow flow of fluid into valve body 501, and to prevent reverse flow. In an embodiment of the invention, check valve 512 and check valve 505 can require a minimum of 1.5 psi of water pressure to allow flow through the check valve. Additionally, these check valves can cause a pressure drop of 1.5 psi as fluid such as water flows across the check valve. Cap 503 is threadedly connected to valve body 501.

FIG. 5B presents a sectional view of first mixing valve 500 in a configuration open to heated water flow and supply water flow in an embodiment of the invention. Second water supply path 123 is shown connected via threaded pipe and elbow 502 to provide supply water through check valve 505 which provides flow into mixing chamber 504, but does not allow flow in the opposite direction. Heated water from heated water path second section 125 enters the top of valve body 501 past check valve 512 and past poppet 514 to enter mixing chamber 504. Thermal actuator 520 is contained in cup 522 which maintains threaded guide 534 and molded diaphragm 536 in place. Cup 522 can be made of brass or stainless steel or other conductive metal that is not reactive. When heated, thermal actuator 520 expands, pushing molded diaphragm 536 into elastomer plug 524 which contacts antiextrusion disc 526 to push mixing piston 528 towards piston casing 518. Spring 532 provides a return force to move piston casing 518 away from seat O-ring 515 as the temperature of thermal actuator 520 cools and the force on mixing piston 528 is reduced. In this way, first mixing valve 500 is controlled by thermal actuator 520 to automatically regulate temperature of a fluid such as water and provides tempered water to tempered water path 126. The movement of piston casing 518 adjusts the amount of heated water from heated water path second section 125 and second water supply path 123 to allow first mixing valve to mix heated water and supply water to produce tempered water path 126. Casing shoulder 530 retains one end of spring 532 while seat collar 516 retains the other end of spring 532. Seat O-ring 515 is positioned adjacent seat collar 516 and forms a seal with piston casing 518 or poppet 514 as either move in contact with seat O-ring 516.

Molded diaphragm 536 is preferably made of an elastomer material such as fluorocarbon elastomer that can deform and allow thermal actuator 520 to push the diaphragm 536 towards elastomer plug 524. In one embodiment, the molded diaphragm 536 is prepared using a compression mold die set in the form of the desired shape, roughly disc-shaped. The die is filled with polymer, preferably Viton Brand GF600S fluorocarbon elastomer and compression molded under heat and pressure. The material can be cooled within the die to produce a molded part. The molded part can be trimmed of excess material to a desired shape. The molded part then can be post cured at 450 degrees F. for up to five hours to increase molecular cross linking to add strength and flexibility and create a molded diaphragm 536.

Figure 5C:
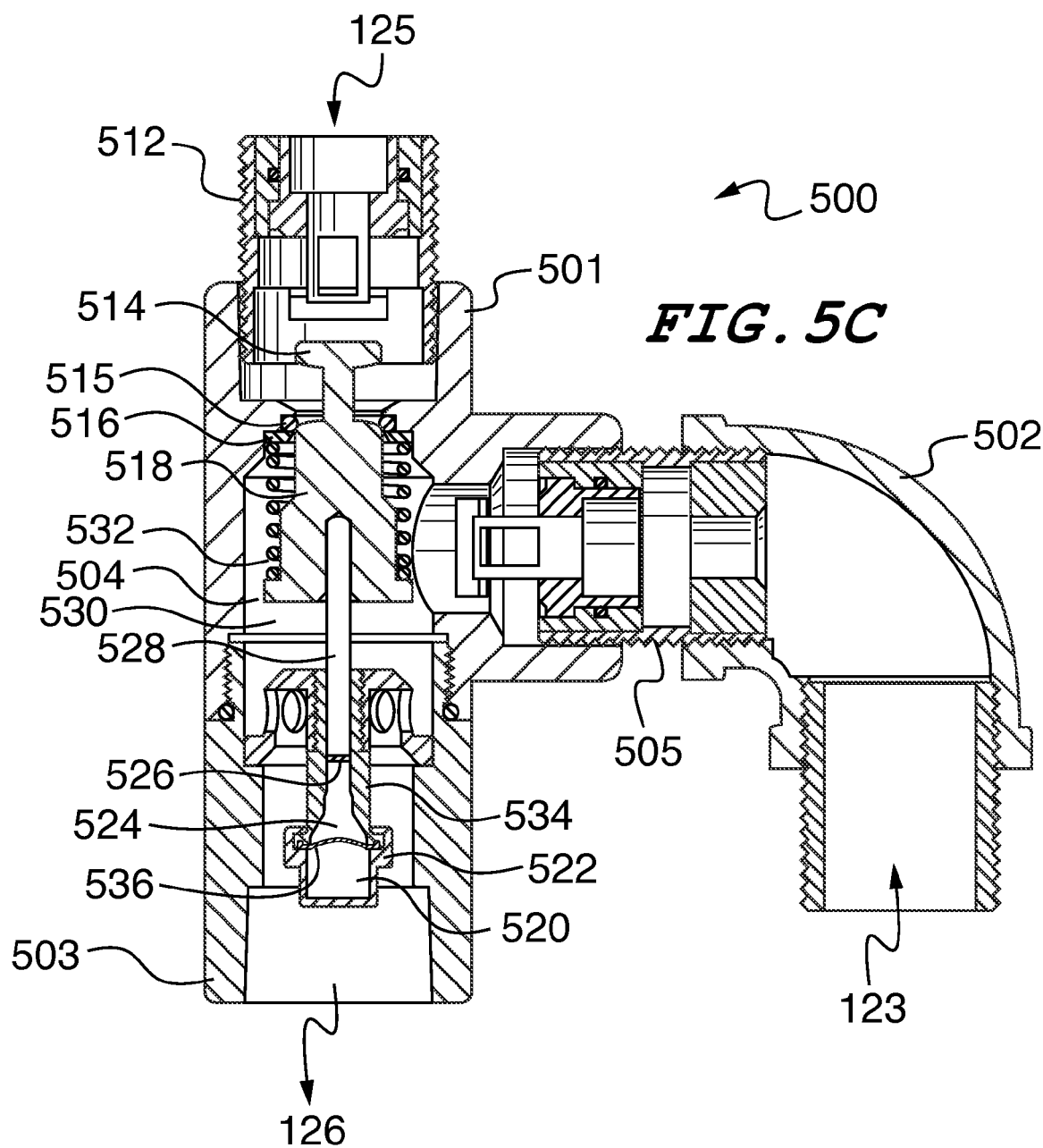
FIG. 5C is a sectional view of a first mixing valve closed to heated fluid flow in an embodiment of the invention.

FIG. 5C presents a sectional view of first mixing valve 500 in a configuration substantially closed to heated water flow in an embodiment of the invention. Thermal actuator 520 can comprise wax, a paraffin wax, or a paraffin wax mixed with a powdered metal and an elastomer. A suitable thermal actuator can be selected as having a melting point in the range of 95 to 100 degrees F. A suitable mixture can be C-20 paraffin wax, mixed with copper powder and a binder. In an embodiment, a suitable thermal actuator can comprise 20% Eicosane mixed with 4% Elastol brand binder and 76% copper flake, to provide a thermal actuator that melts in the range of 95 to 100 degrees F. As the temperature of water passing thermal actuator 520 increases, the thermal actuator 520 melts and pushes molded diaphragm 536 and elastomer plug 524 into antiextrusion disc 526 which in turn forces mixing piston 528 and piston casing 518 upward to engage seat O-ring 515 and close off the flow of heated water path second section 125 into mixing chamber 504. In a particular embodiment, thermal actuator 520 begins closing second mixing valve 500 to heated water path second section 125 upon sensing tempered water path 126 exiting mixing chamber 504 at 95 degrees F. or greater. In this way, overtemperature conditions are avoided as the flow from heated water path second section 125 is reduced as the temperature of the water flow in contact with cup 520 exiting valve body 501 rises. Cap 503 retains carrier 508. Carrier 508 is threadedly attached to threaded guide 534. Cap 503 is threadedly attached to valve body 501 with O-ring 517 to make a seal. In an alternate embodiment, thermal actuator 520 can be designed to melt and expand in a range of 95 to 105 degrees F. In an embodiment, thermal actuator 520 can expand to completely close off the flow from heated water path second section 125 when tempered water path 126 is sensed at about 105 degrees F. or greater. Thermal actuator 520 would begin to expand at temperatures greater than about 95 degrees F. and begin to reduce the flow from heated water path second section 125.

Figure 5D:
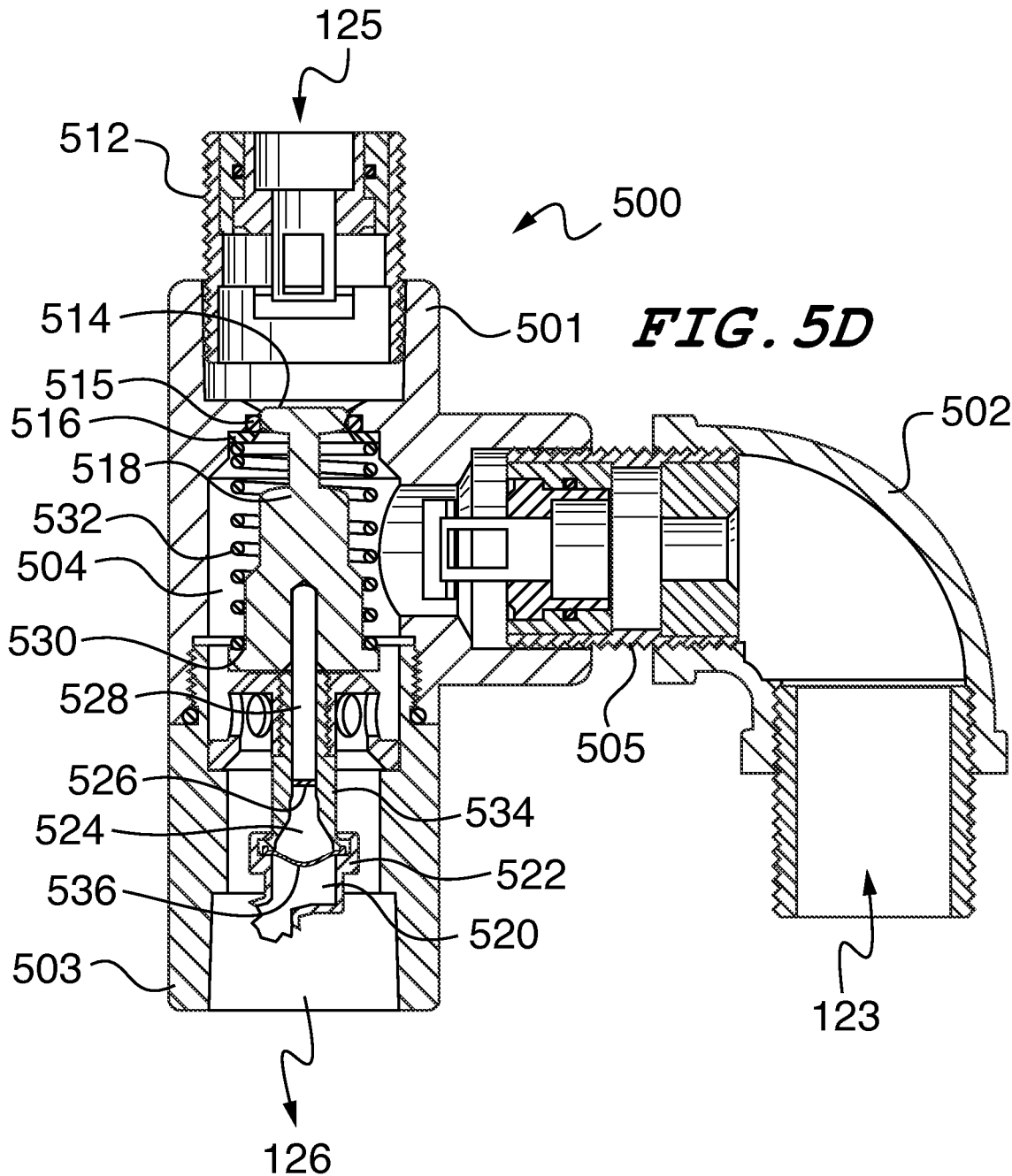
FIG. 5D is a sectional view of a first mixing valve shown in a failed configuration and closed to heated water flow in an embodiment of the invention.

FIG. 5D presents a sectional view of a first mixing valve 500 shown in a cup failure configuration in an embodiment of the invention. Failure of cup 522 can result in the loss of the thermal actuator 520. Failure of the cup 522 can occur either as a structural failure of the cup 522 and failure to retain thermal actuator 520 or any other event which results in the loss or leakage of the thermal actuator 520 which can be called actuator failure. As an additional safety feature, upon failure of cup 522, or failure of thermal actuator 520, spring 532 moves piston casing 518 further comprising poppet 514 away from check valve 512 and heated water path second section 125. This causes poppet 514 to contact seat O-ring 515 and close off the flow of heated water into the mixing chamber 504 in the event of thermal actuator 520 malfunction. In this configuration, supply water continues to flow from second water supply path 123 into the mixing chamber 504, through tempered water path 126, and through the system, when activation valve 800 (not shown) is open.

Figure 6A:
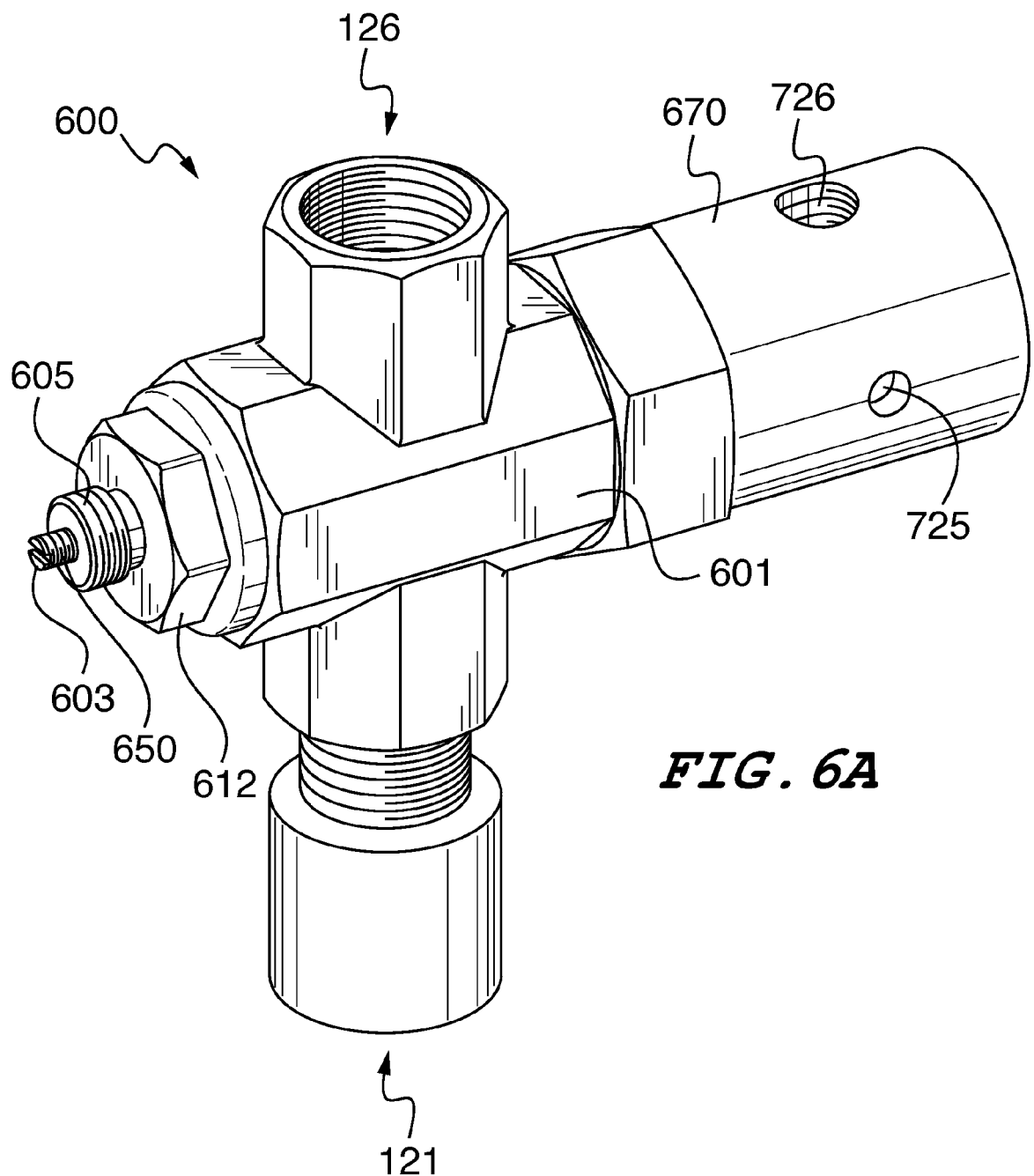
FIG. 6A is a perspective view of a second mixing valve in an embodiment of the invention.

FIG. 6A shows a perspective view of second mixing valve 600 in an embodiment of the invention. Valve body 601 is cross shaped and generally hollow with threaded connections for attaching other threaded elements. Tempered water path 126 enters into the top of the valve body 601. Third water supply path 121 enters the bottom of valve body 601. Calibration stem 650 has distal end 603 which can be slotted to allow for rotation. Distal end 603 is accessible on the exterior of second mixing valve 600 and held in place by end cap 612 which provides attachment and retention of valve elements. End cap 612 is configured with exterior threads 605 that can receive a protective cap, not shown, to prevent accidental movement of calibration stem 650. Fitting 670 is threadedly connected to valve body 601 and contains threaded opening 726 and communication port 725 which allow for connection with second feedback controller 700 not shown.

Figure 6B:
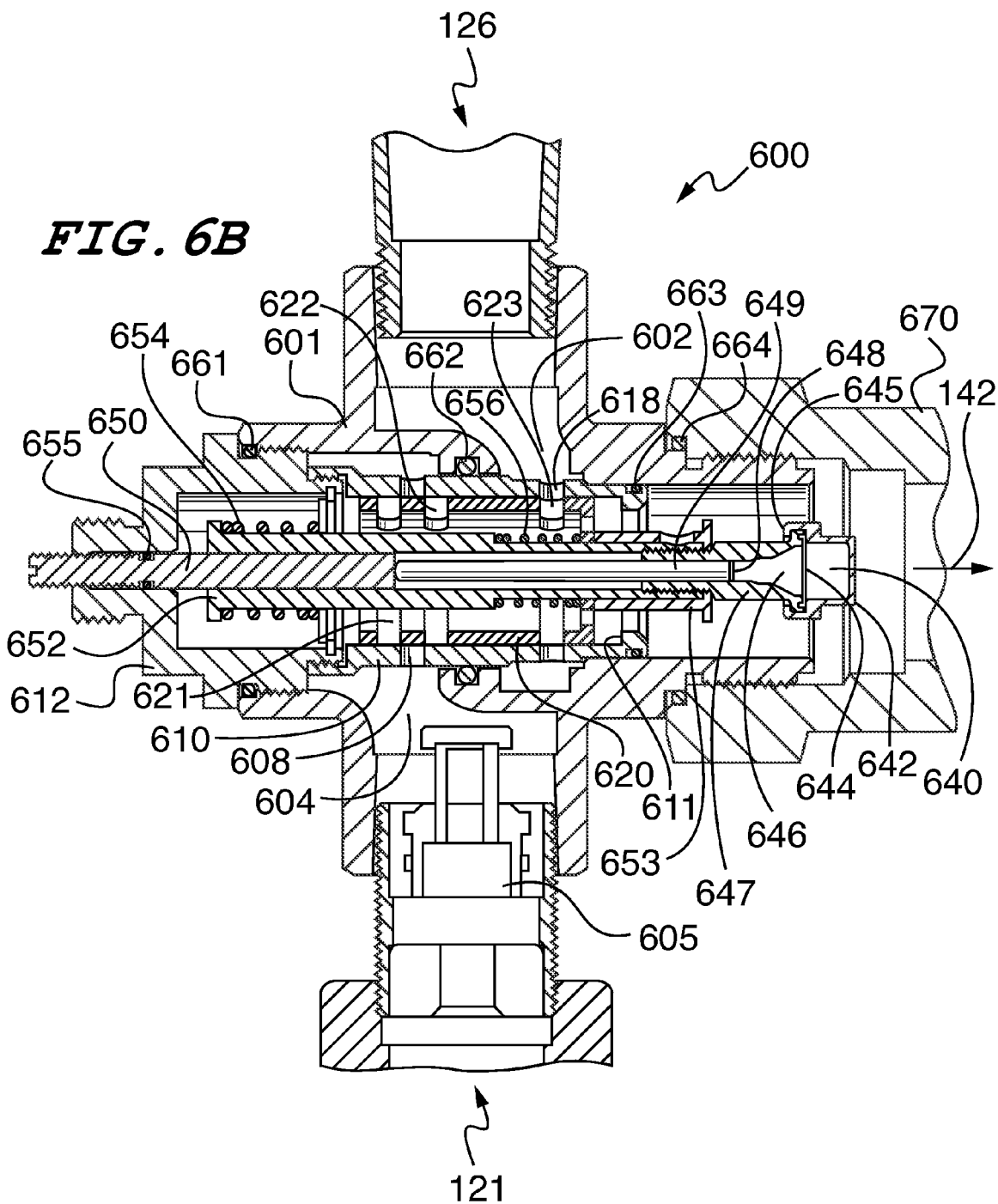
FIG. 6B is a sectional view of a second mixing valve shown in a configuration open to allow the flow of tempered water in an embodiment of the invention.

FIG. 6B shows a sectional view of second mixing valve 600 in an embodiment of the invention. Valve body 601 is generally cross shaped and designed to accept tempered water flow from first mixing valve into first water passage 602. Third water supply path 121 is connected to check valve 605 which allows flow of supply water into the valve body 601 and prevents reverse flow. In an embodiment, check valve 605 can require a minimum water pressure of 3.5 psi to open and initiate flow. As a consequence, check valve 605 creates a pressure drop of 3.5 psi across check valve 605. Passing through check valve 605, supply water flows into second water passage 604 where it encounters spool guide 610 which is cylindrical, and supply port 608 which is an opening in spool guide 610 that allows for the passage of water. Supply port 608 is always open to flow of supply water, but supply water cannot flow into the interior of the valve body 601 unless one of the slots in spool 620 is aligned with the supply port 608. As shown in this figure, spool guide 610 is not aligned to allow for the flow of supply water as the spool 620 is blocking supply port 608 and does not allow for flow of supply water. Spool guide 610 is threadedly attached to end cap 612. Spool 620 is positioned within spool guide 610 and is movable within spool guide 610. Primary supply slot 621 in spool 620 provides an opening for the flow of water into the interior of valve body when it is at least partially aligned with supply port 608.

First water passage 602 directs the flow of tempered water stream 126 towards tempered port 618 which is an opening in spool guide 610. Spool 620 has tempered slot 623 positioned to overlap tempered port 618 to allow the flow of tempered water into the valve body 601. Spool 620 is slidable within spool guide 610 and is shown as aligning tempered slot 623 with tempered port 618. This allows the flow of tempered water from first water passage 602 through tempered port 618 and through tempered slot 623 into the interior of valve body 601. Calibration stem 650 is shown positioned partially within spool 620 and spool guide 610. Calibration stem 650 can be turned and moved further inside end cap 612 or reversed to remove calibration stem 650 to a position withdrawn from the inside of valve body 601. The effect of this adjustment is to determine the position of spool 620. As the calibration stem 650 is adjusted interior to the valve body, it determines the position of piston 649, threaded guide 647, and spacer 653 to effect a movement of spool 620 within spool guide 610 and, moving the spool 620 to the right in FIG. 6B, moves primary supply slot 621 so that it begins to align with supply port 608. A corresponding movement in the same spool 620 moves tempered slot 623 so that alignment with tempered port 618 is reduced. In this way, a greater amount from third water supply path 121 and a smaller amount of tempered water from tempered water path 126 is delivered to the interior of valve body 601 and fine adjustment of calibration stem 650 can adjust the temperature performance of second mixing valve 600. The temperature of tepid water stream 142 can be adjusted by turning calibration stem 650. Tepid water stream 142 passes past thermal actuator 640 into fitting 670.

Thermal actuator 640 is positioned within cup 642 and held in place by molded diaphragm 644 and threaded guide 647 which are both retained by cup lip 645 which can be formed by crimping. Cup 642 can be made of brass or stainless steel or other non-reactive metal. Molded diaphragm 644 can be made in the same manner as molded diaphragm 536 not shown, in an embodiment of the invention. Elastomeric plug 646 contacts antiextrusion disc 648 to transfer movement to piston 649. Thermal actuator 640 comprises a thermally expansive compound, such as a paraffin wax, or a mixture of a wax, powdered metal, and a binder to provide expansion within a desired temperature range. In an embodiment, 20% C-18 paraffin wax (Octadecane) can be combined with 4% Elastol brand binder and 76% copper powder to produce a thermal actuator with a melting point between approximately 80 and 87 degrees F. As thermal actuator 640 is warmed past its melting point, the compound expands to move molded diaphragm 644 into elastomeric plug 646 which is roughly conical in shape. For a thermal actuator based on an eighteen carbon paraffin wax, the thermal actuator 640 would begin to expand at a temperature greater than 80 degrees. In an embodiment, thermal actuator 640 expands to completely close tempered water path 126 upon sensing tepid water stream 142 at about 87 degrees F. or greater. Other molecular weight compounds and paraffins can be utilized in various embodiments to produce different temperature performance, with higher molecular weight molecules typically having higher melting points. As elastomeric plug 646 is forced into threaded guide 647, the additional conical diameter is compressed and accentuates the lateral travel of the antiextrusion disc 648 which in turn provides increased travel of piston 649 away from cup 642. Elastomeric plug 646 is made of an elastomeric material, e.g. silicone in an embodiment of the invention, but other malleable or elastomeric materials can provide the same function such as nitrile rubber (Buna-N) or Viton brand fluoropolymer elastomer. Piston 649 contacts calibration stem 650 which is threadedly attached to end cap 612 and prevents piston 649 from moving. Piston sleeve 652 is slidable over calibration stem 650. Piston sleeve 652 is threadedly attached to threaded guide 647 and is held in position by operating spring 654 and overtravel spring 656. When piston 649 is forced away from cup 642, it cannot move to the left of FIG. 6B. Therefore, to accommodate the expansion, piston sleeve 652, threaded guide 647, and spacer 653 (as well as other elements) move to the right of FIG. 6B, and as spacer 653 is connected to spool 620, spool 620 is therefore drawn to the right and adjusts the relative amount of flow allowed from tempered port 618 and supply port 608. Spool travel is limited by spool guide shoulder 611 which has a reduced circumference and limits spool travel. Overtravel spring 656 absorbs the additional movement of piston sleeve 652 and attached elements when spool 610 contacts spool guide shoulder 611. When thermal actuator 640 is not expanded, piston sleeve 652 is biased by operating spring 654 which also returns the spool 610 to align tempered slot 623 with tempered port 618. Spool guide 610 can be made from metal and in one embodiment is made of 303 stainless steel. Spool 620 can be made of metal and in one embodiment is made of 303 stainless steel. It has been found that metal parts that rub together can be improved by a lubricious coating to prohibit scale buildup over time, for example PTFE coatings or a combination of PTFE and nickel can be applied to increase longevity. Valve body 601 can be made of bronze while end cap 612 can be made of brass. Numerous O-rings are used in the construction of second mixing valve 600 to prevent leaks. O-rings 661, 662, 663, 664, and 655 can be made of EPDM rubber and provide a seal.

Figure 6C:
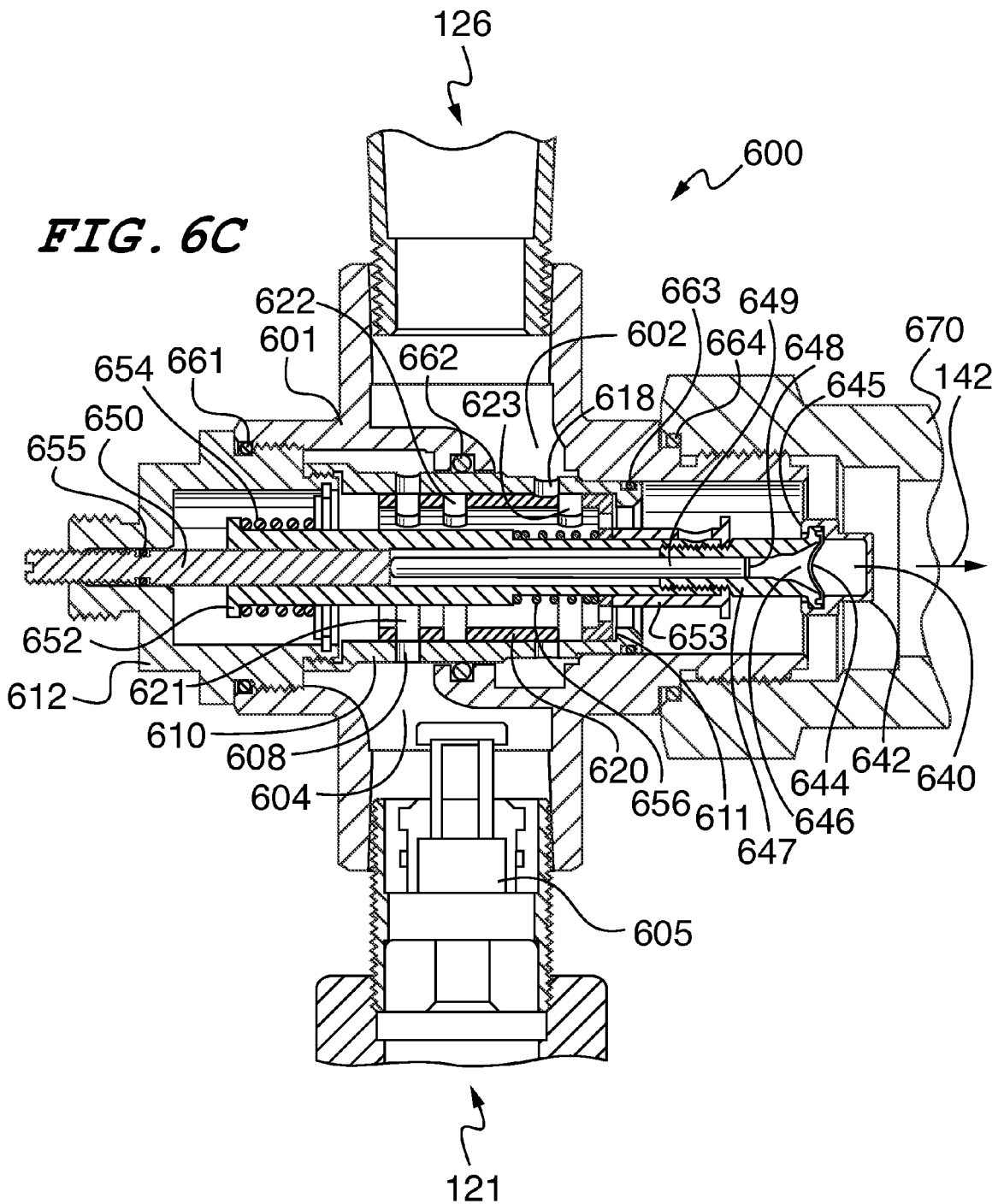
FIG. 6C is a sectional view of a second mixing valve shown in a configuration open to supply water in an embodiment of the invention.

FIG. 6C presents a sectional view of second mixing valve 600 open to supply water flow in an embodiment of the invention. In this view, thermal actuator 640 has expanded, increasing the distance of piston 649 from cup 642. The result is to draw threaded guide 647, spacer 653, and piston sleeve 652, so that primary supply slot 621 is aligned with supply port 608. The movement of cup 642 away from calibration stem 650 is known as reverse acting. Contrary to the elements in the first mixing valve 500, (where movement of a piston causes movement of a piston casing) here, the expansion causes cup 642 itself to move away from the piston and cause movement of the other elements attached to cup 642. In this configuration, second mixing valve 600 is shown as open to supply water flow.

In operation, the spool will be in a position between that shown in FIG. 6B and FIG. 6C, allowing for flow of tempered water stream and supply water, and can be calibrated via calibration stem 650 to position the spool to provide tepid water stream 142 at a desired temperature.

Figure 6D:
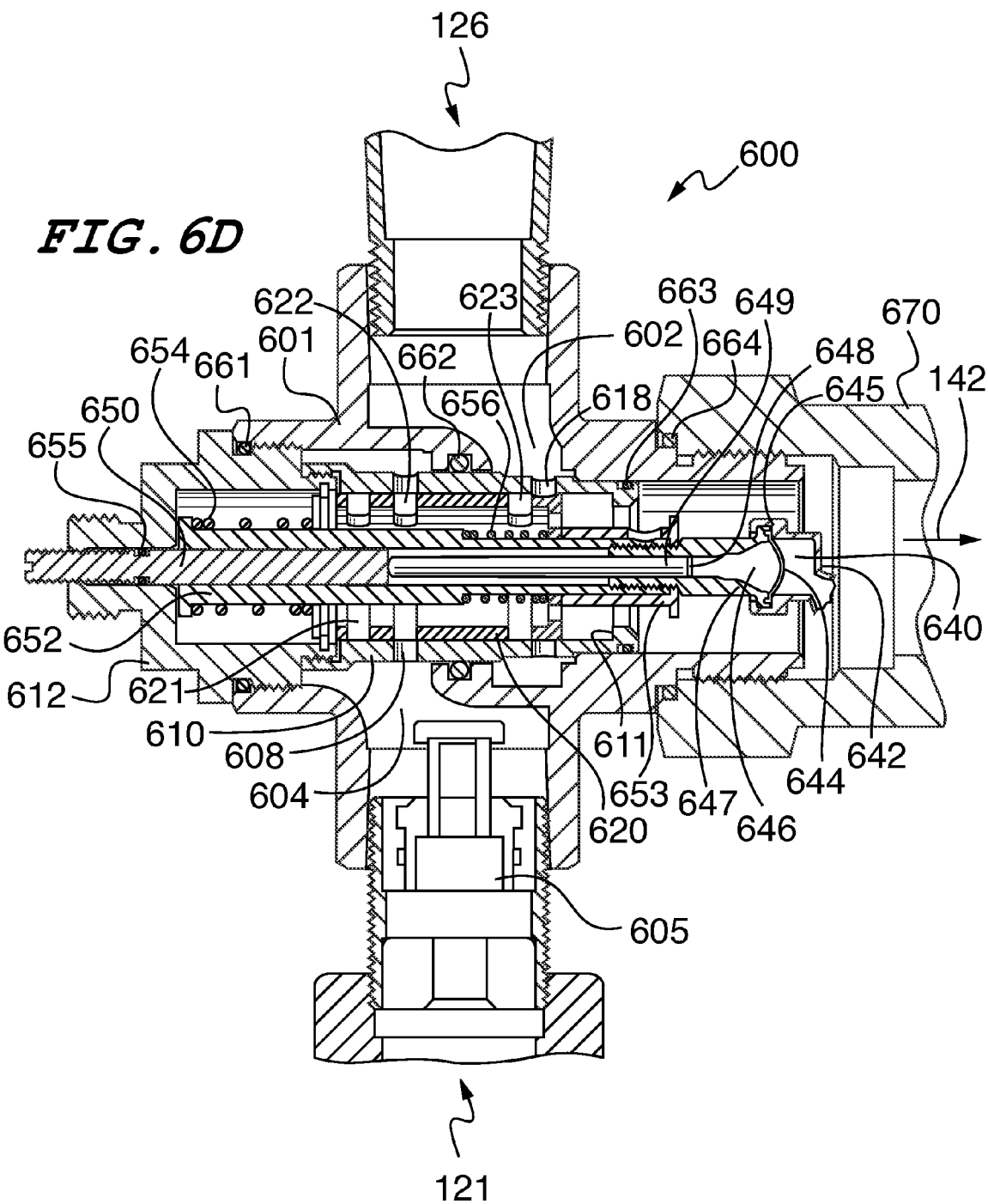
FIG. 6D is a sectional view of a second mixing valve shown in a failed configuration open to supply water.

FIG. 6D presents a sectional view of second mixing valve 600 in a failed configuration in an embodiment of the invention. In the event of failure of cup 642, or loss or failure of thermal actuator 640, operating spring 654 forces piston sleeve towards the left side of the figure and would force cup 642 towards piston 649 and displacing plug 646 into cup 642. It is desired to keep second mixing valve open to supply water flow from first water supply path 121. The configuration of the embodiment shown provides that secondary supply slot 622 would be aligned with supply port 608 to allow for the flow of supply water into the valve body 601. Secondary supply slot 622 is shown as extending around spool 620 which is cylindrical. In this way, failure of thermal actuator 640 provides that supply water from third water supply path 121 still flows through second mixing valve 600 and through the system of the invention.

FIG. 6E shows a perspective view of a spool 620 in an embodiment of the invention. Primary supply slot 621 is shown formed within the cylindrical spool 620, but does not extend around the circumference as that would sever the spool. Gap 631 is shown as interrupting the cutout of primary supply slot 621. Secondary supply slot 622 is formed in spool 620 and is interrupted by gap 632. Tempered slot 623 is formed within spool 620 and interrupted by a third gap 633 which allows spool 620 to retain its structure. Spool central opening 634 allows piston 649 not shown and other elements from FIG. 6B to pass through the center of spool 620. Spool flow opening 635 and spool flow opening 636 allow water to flow through the spool.

FIG. 7A presents a perspective view of second feedback controller 700 in an embodiment of the invention. Sensor body 750 is cylindrical and substantially hollow. First drain port 710 is connected to sensor body 750 via fitting 711. Second drain port 730 is connected to sensor body 750 by way of elbow fitting 731 and cap 732. Elongated cup 714 extends from the bottom of sensor body 750 and is suited for insertion into threaded opening 726 as shown in FIG. 6A. Elongated cup 714 can be made of 303 stainless steel or alternately brass or other non reactive metal. Threaded section 751 provides for threaded connection with fitting 670 as shown in FIG. 6A.

FIG. 7B shows a sectional view of second feedback controller 700 in steam shutdown configuration in an embodiment of the invention. This view shows sensor body 750 threadedly attached to fitting 670 in an embodiment of the invention. Second feedback controller 700 functions to produce pressure communication signals to provide feedback control of second feedback control valve 300 not shown. A thermal actuator 712 in contact with tepid water stream 142, not shown, can expand to produce different pressure communication signals to provide feedback control of second feedback control valve 300 not shown. Second feedback controller 700 acts upon a first pressure signal to open second feedback control valve 300 to the flow of steam. Second feedback controller 700 acts upon movement of thermal actuator 712 to achieve a configuration that provides a separate set of pressure communication signals to close second feedback control valve 300 to the flow of steam. In this way, second feedback controller 700 functions to open the flow of steam in the system upon activation of water flow when a user opens activation valve 800 (not shown) to initiate water flow. Activation valve 800 can be positioned downstream of second feedback controller 700 as is known in the art and comprise a ball valve or other valve to open and close flow means such as a pipe to the flow of water as is known in the art. When activation valve 800 is opened, it opens the system to water flow. When activation valve 800 is closed, it closes the system to water flow. Additionally, second feedback controller 700 functions to shut off the flow of steam if an overtemperature condition is sensed in tepid water stream 142. The details of the operation are herein described.

First drain port 710 is in fluid communication with top drain port 322 of FIG. 3A. First drain port 710 is connected to sensor body 750 by first fitting 711. Fluid communication can be accomplished by the connection of a rubber hose, braided fabric hose, or malleable thin metal piping attached with a ferrule or other connection means known in the art that provides fluid flow. In an embodiment, threaded fittings can be used to connect PTFE tubing shrouded with stainless steel braid to provide flexibility and strength. Fluid communication also provides pressure communication. Second drain port 730 is in fluid communication with bottom drain port 332 of FIG. 3A through connection means. Second drain port 730 is connected to cap 732 by threaded connection of elbow fitting 731. Flow communication port 720 is in fluid communication with flow port 725 and provides an equalization of water pressure between flow communication port 720 and flow port 725. Flow port 725 can provide connection by friction fit or threaded connection or other means known in the art. Flow communication port 720 is connected to sensor body 750 by second fitting 721 threadedly connected to sensor body 750. Flow port 725 can be located in various positions within fitting 670, but is shown adjacent to sensor body 750 in this view so that it appears in the cross section of this Figure. It can also be positioned as shown in FIG. 6A without significant effect on function. Piston 740 is contained within thermal actuator 712 in an elongated cup 714. In an embodiment, thermal actuator contains a C20 paraffin wax Eicosane that has a melting point of about 97.5 degrees F. To improve thermal conductivity a metal flake or powder can be added and to improve consistency, a binder can be added. In one embodiment, thermal actuator 712 comprises 20% Eicosane, 76% copper flake, 4% Elastol brand binder. This mixture provides a thermal actuator with an operating range of about 95 to 100 degrees F. Piston 740 contacts piston casing 716 and when thermal actuator 712 is heated and expands, piston casing 716 interfaces with O-ring 718 to close off second drain port 730 from communication with any pressure interior to sensor body 750, and therefore closes second drain port 730 to any pressure signal. In the absence of any force of thermal actuator 712 upon piston 740, spring 722 forces piston casing 716 downward so that O-ring 724 contacts shoulder 726 to form a seal. Second feedback controller 700 is then in steam shutdown configuration as shown. Upon opening of activation valve 800 (not shown) by a user, water flow begins through the interior of fitting 670. Check valve 605 in e.g. FIG. 6B effects a pressure drop of 3.5 psi, in an embodiment of the invention. Thus flow port 725 is in communication with a pressure signal that is about 3.5 psi less than the pressure of supply water. Supply water is provided to ports 320 and 330 in FIG. 3A. When piston casing 716 is down, as in FIG. 7B, first drain port 710 is closed and provides no communication or flow; second drain port 730 is equalized with flow communication port 720. When there is no flow of water through fitting 670 (activation valve 800 is closed), there is similarly no pressure signal and no flow. Thus, there is no pressure signal being communicated by second feedback controller 700 and the diaphragm 304 of FIG. 3B is controlled by spring 352 to keep second feedback control valve 300 in a closed configuration.

Upon opening of activation valve 800 not shown, by a user, water flow past flow port 725 will begin and a pressure less than supply water pressure will be communicated through flow port 725 to flow communication port 720 which is in communication with second drain port 730, which then in turn provides for flow from bottom drain port 332 of FIG. 3A; because bottom drain port 332 is now open to flow towards the lower pressure in fitting 670, the pressure within second space 311 (in second dished head 308) is less than the pressure within first space 309 (in first dished head 306) and this increased pressure is sufficient to overcome the resistance of spring 352 and moves second feedback control valve into the open position as shown in FIG. 3C. In this way, opening of the system to flow via activation valve 800 not shown, opens bottom drain port 332 to flow, and causes the second feedback control valve to open and provide steam to steam path third section 108.

The system also provides for steam shutdown when an overtemperature condition is sensed by second feedback controller 700. Thermal actuator 712 can be made of a substance that expands when heated such as a paraffin wax with a melting point between 95 and 100 degrees F. In an embodiment, thermal actuator can comprise 20% C20 paraffin wax, 4% binder such as Elastol, and 76% copper flake to provide a melting point of around 95 to 100 degrees F. Elongated cup 714 is exposed to tepid water flow 142 through fitting 670. Piston 740 is sealed by seal 708 which can be a spring energized lip seal. Elongated cup 714 is threadedly attached to piston sleeve 751 which in turn is threadedly connected to sensor body 750. If elongated cup 714 is exposed to an overtemperature condition, thermal actuator 712 will melt and expand pushing piston 740 into piston casing 716 and upward so that O-ring 724 does not engage shoulder 726 and allows communication between the three ports 710, 720, and 730. This has the effect of equalizing the pressures in the first dished head 306 and second dished head 308 as shown in FIG. 3C. As there is no force transmitted by activation screw 310, upon equalization of pressure, spring 352 is somewhat compressed and begins to move diaphragm piston 316 upward and moving plug 358 closer to cap seat interface 346 to begin to reduce the flow of steam through second feedback control valve 300.

As thermal actuator 712 continues to expand, piston 740 is pushed further upwards so that piston casing 716 engages O-ring 718 to close off second drain port 730 from communication with the flow communication port 720. Therefore, bottom drain port 332 of FIG. 3C is no longer open to a reduced pressure and is no longer open to draining. The pressure in bottom dished head 308 and second space 311 is then quickly restored to supply pressure. First dished head 306 and first space 309 are is still in communication as top drain port 322 is in communication with first drain port 710 which is still in communication with flow communication port 720 which in turn is connected to the lower pressure of flow port 725 and open to the outlet of the system. In this way, first space 309 is at a lower pressure than second dished head 308 and second space 311 which causes the diaphragm 304 to move to the configuration in FIG. 3B and close second feedback control valve 300 to the flow of steam. In this way, second feedback controller 700 provides feedback control of second feedback control valve 300 to quickly shut off the flow of steam if an overtemperature condition is present in tepid water stream 142.

O-ring 719 aids in the connection of cap 732 to sensor body 750. O-ring 752 aids in the connection of piston sleeve 751 to elongated cup 714 to form a seal.

Figure 8:
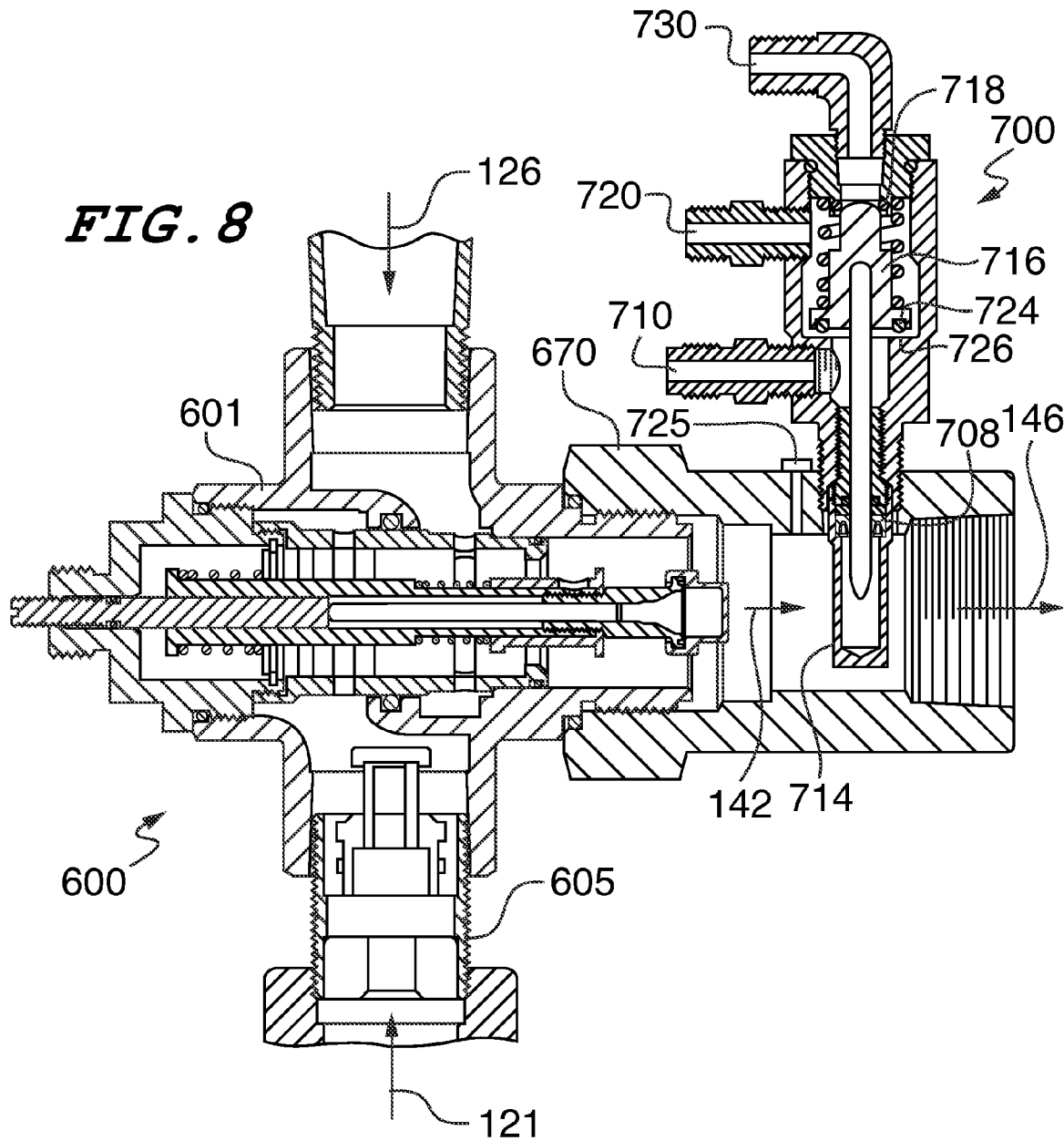
FIG. 8 is a sectional view of second mixing valve and second feedback controller in an embodiment of the invention.

FIG. 8 presents a side view of second mixing valve 600 connected to second feedback controller 700 in an embodiment of the invention. Fitting 670 is threadedly attached to valve body 601. Tepid water outlet 146 is shown exiting fitting 670. Second feedback controller 700 is shown in an operating configuration. As shown, piston casing 716 is in contact with O-ring 718. This closes second drain port 730 to draining via communication with flow communication port 720. Further, O-ring 724 is not in contact with shoulder 726 allowing first drain port 710 to be in communication and equalize with flow communication port 720. As first space 309 is open to drain via port 710 while second space 311 is at supply pressure, second feedback control valve 300 is closed to the flow of steam. As piston casing 716 contacts O-ring 718, pressure communication closes valve 300 to steam flow.

The system of devices as herein presented provides significant advantages in function, response time, and reliability. The specific valves and assemblies have been presented to enable the practice of the invention, but the spirit of the invention comprises the use of the various feedback control mechanisms to provide consistent operation of a heated fluid system at various flow rates. It will be appreciated that various embodiments can provide similar functions with the scope of the invention.

What is claimed is:

1. An automated water temperature control system comprising:
    a steam path comprising a first feedback control valve and a second feedback control valve, said steam path delivering steam to a heat exchanger;
    a first water supply path delivering water to said heat exchanger which exchanges heat from said steam path to said first water path to produce heated water to a heated water path;
    a first feedback controller in contact with said heated water path, said first feedback controller comprising a thermally expansive substance to provide feedback control of said first feedback control valve;
    a first mixing valve connected to said heated water path and connected to a second water supply path, the first mixing valve controlled by a first thermal actuator to provide tempered water to a tempered water path;
    a second mixing valve connected to said tempered water path and a third water supply path, the second mixing valve controlled by a second thermal actuator to produce a tepid water stream;
    a second feedback controller in contact with said tepid water stream, the second feedback controller comprising a third thermal actuator to produce pressure communication signals to provide feedback control of said second feedback control valve; and an activation valve positioned downstream of said second feedback controller that opens or closes the system to water flow.

2. The automated water temperature control system of claim 1 wherein:
said first feedback control valve further comprises a steam plunger movable by a steam piston within a valve body, said steam plunger providing an open configuration that allows steam flow through said valve body, said steam plunger providing a restricted configuration that reduces steam flow through said valve body, said steam piston providing a force on said steam plunger towards said restricted configuration, and a spring providing a force on steam plunger towards said open configuration.

3. The automated water temperature control system of claim 2 wherein:
said first feedback controller comprises a coil filled with an elastomer that expands when heated to provide a force to a capillary piston to contact said steam piston to control said first feedback control valve.

4. The automated water temperature control system of claim 2 wherein:
said steam plunger further comprises a plunger shoulder and a plunger bottom wherein a plurality of holes are disposed within the periphery of said steam plunger, said plurality of holes allow for flow of steam from a steam inlet, through said plunger bottom to said plunger shoulder, towards a steam outlet.

5. The automated water temperature control system of claim 2 wherein:
said steam plunger in a restricted configuration contacts an O-ring in said valve body to close said first feedback control valve to flow of steam through a steam passage and allow flow of steam through a plurality of holes disposed within a plunger shoulder.

6. The automated water temperature control system of claim 1 wherein:
said second feedback control valve further comprises a first dished head and a second dished head connected to retain a diaphragm, a first space between said diaphragm and said first dished head, a second space between said diaphragm and said second dished head, said first space in fluid communication with a top supply port and a top drain port, said second space in fluid communication with a bottom supply port and a bottom drain port, said diaphragm engaged by an activation screw so that a pressure in said second space less than the pressure in said first space forces said diaphragm and said activation screw towards a valve body and forces a valve cage to overcome a spring to separate a plug from a cap seat interface and open the second feedback control valve.

7. The automated water temperature control system of claim 3, wherein:
said first feedback controller further comprises a capillary piston guide retained by a guide nut threadedly attached to a capillary actuator cup containing a thermal channel filled with said elastomer, the expansion of said elastomer provides a force upon a diaphragm adjacent to an actuator plug which transmits the force to an antiextrusion disc which transfers the force to a capillary piston disposed within a heat dissipater having a threaded distal end suited for attachment to said first feedback control valve, the movement of said capillary piston affecting movement of said steam piston to control said first feedback control valve.

8. The automated water temperature control system of claim 7, further comprising:
a swivel threadedly attached to said capillary piston guide, a retaining ring positioned within a circumferential groove, at least one set screw retaining said heat dissipater between said swivel and said retaining ring, the removal of said at least one set screw allowing said heat dissipater to be rotated to effect threaded connection of said threaded distal end of said heat dissipater to stem threads of said first feedback control valve.

9. The automated water temperature control system of claim 1, wherein:
said second mixing valve further comprises a spool disposed within a spool guide, said spool having a primary supply slot, and a tempered slot, said spool guide having a supply port and a tempered port.

10. The automated water temperature control system of claim 9, further comprising:
a thermal actuator retained within a cup by a molded diaphragm, a piston disposed within a piston sleeve threadedly attached to a threaded guide retained by a cup lip, wherein said thermal actuator upon heating expands and forces said molded diaphragm into an elastomeric plug that transfers the force to an antiextrusion disc to force the piston against a calibration stem to overcome an operating spring and move said spool within said spool guide to at least partially align said primary supply slot with said supply port and allow the flow of third water supply path into said second mixing valve.

11. The automated water temperature control system of claim 10, further comprising:
said calibration stem threadedly connected to an end cap providing that turning said calibration stem determines the position of said piston disposed within a threaded guide, said threaded guide threadedly connected to a spacer that controls the position of said spool within said spool guide to adjust the amount of said third water supply path and the amount of tempered water entering a valve body.

12. The automated water temperature control system of claim 10, wherein:
upon failure of said cup, said operating spring moves said spool within said spool guide to align a secondary supply slot disposed within said spool to align said secondary supply slot with said supply port to allow the flow of supply water through said second mixing valve.

13. The automated water temperature control system of claim 1, wherein:
said first thermal actuator controls a piston to move a piston casing to contact a seat O-ring to close said first mixing valve to said heated water path.

14. The automated water temperature control system of claim 13 wherein:
said piston casing further comprises a poppet that upon failure of said first thermal actuator, is moved by a spring to contact said poppet with said seat O-ring to close said first mixing valve to said heated water path.

15. An automated water temperature control system for tepid water delivery, comprising:
a steam path comprising a first feedback control valve having an open configuration and a restricted configuration, and a second feedback control valve having an open configuration and a closed configuration such that when second feedback control valve is in said open configuration, steam is delivered to a heat exchanger;
a water supply path that provides water to said heat exchanger to produce a heated water path when second feedback control valve is in said open configuration;

a first feedback controller in contact with said heated water path that puts said first feedback control valve in said restricted configuration when said heated water path is over about 130 degrees F.;

a first mixing valve controlled by a first thermal actuator to mix said heated water path and a second water supply path to produce a tempered water path, wherein said first thermal actuator begins closing said second mixing valve to said heated water path upon sensing a temperature equal to or greater than 95 degrees F.;

a second mixing valve controlled by a second thermal actuator to mix said tempered water path and a third water supply path to produce a tepid water stream, said second thermal actuator allowing alignment of a tempered slot in a spool with a tempered port in a spool guide when said tepid water steam is less than 80 degrees F., said second thermal actuator acting upon a piston to control the position of said spool relative to said spool guide and at least partially align a primary supply slot in said spool with a supply port in said spool guide at a temperature greater than 80 degrees F.;

a second feedback controller in contact with said tepid water stream and opening said second feedback control valve upon sensing the flow of water in a fitting, the second feedback controller further comprising a third thermal actuator that expands when tepid water stream is greater than 95 degrees F. to provide a pressure signal to close said second feedback control valve; and an activation valve that when closed prevents the flow of water through the system and when open allows the flow of water through the system, the system delivering tepid water for use in a safety shower or eyewash.

16. The automated water temperature control system of claim 15, wherein:
said first feedback controller further comprises a coil filled with silicone oil that provides movement of a capillary piston of at least 0.003 inches per degree F. temperature increase in a temperature range of at least 75 degrees F. to 150 degrees F.

17. The automated water temperature control system of claim 15, wherein:
said first thermal actuator expands to completely close said heated water path upon contact with water at 105 degrees F. or greater.

18. The automated water temperature control system of claim 15, wherein:
said second thermal actuator expands to completely close said tempered water path upon contact with water at 95 degrees F. or greater.

* * * * *